US007900835B2

(12) United States Patent
Togashi et al.

(10) Patent No.: US 7,900,835 B2
(45) Date of Patent: Mar. 8, 2011

(54) FOOD PRODUCT TRACE APPARATUS, FOOD PRODUCT TRACE SYSTEM, AND FOOD PRODUCT TRACE METHOD

(75) Inventors: Masataka Togashi, Tokyo (JP); Hidenori Aoyagi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 888 days.

(21) Appl. No.: 11/722,832

(22) PCT Filed: Oct. 26, 2005

(86) PCT No.: PCT/JP2005/019697
§ 371 (c)(1),
(2), (4) Date: Jun. 26, 2007

(87) PCT Pub. No.: WO2007/049344
PCT Pub. Date: May 3, 2007

(65) Prior Publication Data
US 2008/0223929 A1    Sep. 18, 2008

(51) Int. Cl.
*G06F 19/00* (2006.01)
*G06Q 30/00* (2006.01)
*G06Q 90/00* (2006.01)

(52) U.S. Cl. ...................................................... 235/385

(58) Field of Classification Search .................. 235/375, 235/385
See application file for complete search history.

(56) References Cited

U.S. PATENT DOCUMENTS

| | | | | |
|---|---|---|---|---|
| 5,478,990 | A * | 12/1995 | Montanari et al. | 235/375 |
| 6,820,012 | B2 * | 11/2004 | Sunshine | 702/22 |
| 7,617,132 | B2 * | 11/2009 | Reade et al. | 705/27 |
| 2002/0095232 | A1 * | 7/2002 | Jorgenson et al. | 700/99 |
| 2003/0050874 | A1 * | 3/2003 | Sesek et al. | 705/29 |
| 2004/0024784 | A1 * | 2/2004 | Spall et al. | 707/104.1 |
| 2005/0075900 | A1 * | 4/2005 | Arguimbau | 705/1 |

FOREIGN PATENT DOCUMENTS

| | | |
|---|---|---|
| JP | 10 302105 | 11/1998 |
| JP | 2001 297062 | 10/2001 |
| JP | 2003 63622 | 3/2003 |
| JP | 2003 303245 | 10/2003 |
| JP | 2004 86381 | 3/2004 |
| JP | 2005 25581 | 1/2005 |
| JP | 2005 107799 | 4/2005 |

OTHER PUBLICATIONS

U.S. Appl. No. 11/722,844, filed Jun. 26, 2007, Togashi, et al.

* cited by examiner

*Primary Examiner* — Michael G Lee
*Assistant Examiner* — Suezu Ellis
(74) *Attorney, Agent, or Firm* — Oblon, Spivak, McClelland, Maier & Neustadt, L.L.P.

(57) ABSTRACT

It aims, for example, at enabling to easily check whether information displayed on a label etc. attached to a food product is reliable or not. First, a producer 402 registers an ingredient analysis result of a food product. A terminal apparatus 400b of the producer 402 acquires a verification code verifying a production location and a shipment date and time of the food product, from a verification server apparatus 300, at the shipment of the food product. A storage part 202 of a food product trace apparatus 200 stores the verification code, shipment sender information indicating the producer 402, and registration information indicating whether the producer 402 has previously registered the ingredient analysis result of the food product, upon making the verification code, the shipment sender information, and the registration information mutually corresponding. Next, the producer 402 attaches a label displaying the verification code to the food product, and ships the food product. An output part 205 outputs information indicating the production location and the shipment date and time of the food product verified by the verification code inputted by an input part 203, and the shipment sender information and the registration information read by a read part 204.

20 Claims, 12 Drawing Sheets

Fig. 4

```
START
  ↓
S101  STORAGE PART STORES VERIFICATION CODE GENERATED BY VERIFICATION
      SERVER APPARATUS, SHIPMENT SENDER INFORMATION INDICATING SHIPMENT
      SENDER OF FOOD PRODUCT, AND REGISTRATION INFORMATION INDICATING
      WHETHER SHIPMENT SENDER HAS PREVIOUSLY REGISTERED INGREDIENT ANALYSIS
      RESULT OF ANALYZING INGREDIENT OF FOOD PRODUCT, UPON MAKING
      VERIFICATION CODE, SHIPMENT SENDER INFORMATION, AND REGISTRATION
      INFORMATION MUTUALLY CORRESPONDING.
  ↓
S102  INPUT PART INPUTS VERIFICATION CODE GENERATED
      BY VERIFICATION SERVER APPARATUS.
  ↓
S103  READ PART READS SHIPMENT SENDER INFORMATION AND REGISTRATION
      INFORMATION CORRESPONDING TO VERIFICATION CODE INPUTTED
      BY INPUT PART, FROM STORAGE PART.
  ↓
S104  OUTPUT PART OUTPUTS INFORMATION (SHIPMENT LOCATION INFORMATION AND
      SHIPMENT TIME INFORMATION) INDICATING SHIPMENT LOCATION AND SHIPMENT
      TIME VERIFIED BY VERIFICATION CODE INPUTTED BY INPUT PART,
      AND SHIPMENT SENDER INFORMATION AND REGISTRATION INFORMATION READ
      BY READ PART.
  ↓
END
```

FOOD PRODUCT TRACE APPARATUS, FOOD PRODUCT TRACE SYSTEM, AND FOOD PRODUCT TRACE METHOD

TECHNICAL FIELD

The present invention relates to a food product trace apparatus, a food product trace system, and a food product trace method. In particular, the present invention relates to a traceability system using a service of verifying time and position.

BACKGROUND ART

Food products whose qualities and prices vary depending upon production locations are usually sold with an attached label etc. displaying its production location. A purchaser chooses a food product to buy, based on such information displayed on a label etc. Moreover, when qualities and prices of food products vary depending upon freshness degrees, a label etc. displaying a date of manufacture and an eat-by freshness date is similarly referred to. Thus, labels conventionally attached to food products only display information about the food products, such as production locations and freshness degrees.

As a method of a consumer's (purchaser's) objectively examining a production location of a product: a code issue request device located at the production location of the product, at the time of the product shipment, measures its own located position, and requests a production location guarantee device to issue a production location guarantee code including position information indicating the result of measuring the position and time information indicating the time of measuring the position; the production location guarantee device generates the production location guarantee code by performing encryption processing to the position information and the time information, and transmits the generated code to the code issue request device; the code issue request device attaches a code seal displaying the production location guarantee code to a product to be circulated in the market; as to the product with the attached code seal, a consumer transmits a production location checking request including the production location guarantee code displayed on the code seal, from a terminal device; the production location guarantee device performs decryption processing to the production location guarantee code to acquire the position information and the time information, and transmits a production location check message indicating the acquired position information and time information to the terminal device (refer to Patent Document 1, for example).

As a method of verifying time, it is known to the public to generate synthetic information from time information indicating time and temporal change information (for example, weather data) being verification information of the time information and changing in accordance with time progresses, and to use this synthetic information for verification (refer to Patent Document 2, for example). The same can be said for a method of verifying position. As a service practically using this method, COCO-DATES (registered trademark) service (website URL <http://www.mitsubishielectric.co.jp/coco-dates/>) can be cited, for example.

[Patent Document 1] Japanese Unexamined Patent Publication No. 2005-107799
[Patent Document 2] Patent Publication No. 3475145

DISCLOSURE OF THE INVENTION

Problems to be Solved by the Invention

As mentioned above, since the labels conventionally attached to food products only display production locations, freshness degrees, etc. of the food products, it is almost impossible for a purchaser to check whether the displayed contents are reliable information or not. Therefore, if a producer, a distributor, a retailer, etc. attaches a label displaying a falsehood to a food product and ships or sells it, almost all purchasers have no means to know the fact. Even in the case of the production location guarantee code stated above being used, there is a possibility of using a production location guarantee code acquired at a time different from the actual date of manufacturing or at a position different from the actual production location.

The present invention aims, for example, at enabling to easily check whether the information displayed on a label etc. attached to a food product is reliable or not.

Means to Solve the Problems

A food product trace apparatus according to the present invention includes:

a storage part to store verification information verifying a shipment location of a food product, generated by a verification server apparatus which generates the verification information, shipment sender information indicating a shipment sender of the food product, and registration information indicating whether the shipment sender has previously registered an ingredient analysis result of analyzing an ingredient of the food product, upon making the verification information, the shipment sender information, and the registration information mutually corresponding;

an input part to input the verification information generated by the verification server apparatus;

a read part to read the shipment sender information and the registration information corresponding to the verification information inputted by the input part, from the storage part; and an output part to output shipment location information indicating the shipment location verified by the verification information inputted by the input part, and the shipment sender information and the registration information read by the read part.

The verification information is information verifying a shipment location and a shipment time of a food product, and the output part outputs information indicating the shipment location and the shipment time verified by the verification information inputted by the input part, and the shipment sender information and the registration information read by the read part.

Moreover, a food product trace apparatus according to the present invention includes:

a storage part to store a first ingredient analysis result of analyzing an ingredient of a food product;

an input part to input verification information verifying a shipment location of the food product, generated by a verification server apparatus which generates the verification information, and a second ingredient analysis result of analyzing the ingredient of the food product after shipment of the food product;

a read part to read the first ingredient analysis result of the food product shipped at the shipment location verified by the verification information inputted by the input part, from the storage part;

a comparison part to compare, by using a processing device, the first ingredient analysis result read by the read part with the second ingredient analysis result inputted by the input part; and an output part to output a comparison result of the comparison part and shipment location information indicating the shipment location verified by the verification information inputted by the input part.

The first ingredient analysis result is a result of analyzing the ingredient of the food product at shipment of the food product, the storage part stores the first ingredient analysis result upon making the first ingredient analysis result corresponding to the verification information generated by the verification server apparatus, and the read part reads the first ingredient analysis result corresponding to the verification information inputted by the input part, from the storage part.

The first ingredient analysis result is a result of analyzing the ingredient of the food product for each shipment location of the food product, and the read part reads the first ingredient analysis result corresponding to the shipment location verified by the verification information inputted by the input part, from the storage part.

The verification information is information verifying a shipment location and a shipment time of the food product, and the output part outputs the comparison result of the comparison part and information indicating the shipment location and the shipment time verified by the verification information inputted by the input part.

The first ingredient analysis result is a result of analyzing the ingredient of the food product for each shipment location and freshness degree of the food product, and the read part judges a freshness degree of the food product based on the shipment time verified by the verification information inputted by the input part, and reads the first ingredient analysis result corresponding to the shipment location verified by the verification information inputted by the input part and the freshness degree judged, from the storage part.

The shipment location includes a production location of the food product and a transit location in a distribution process of the food product, the shipment time includes a shipment time at the production location and a transit time at the transit location, the verification information is information verifying a position and a time, the storage part stores the first ingredient analysis result of analyzing the ingredient of the food product at shipment of the food product upon making the first ingredient analysis result corresponding to the verification information verifying the production location and the shipment time of the food product, generated by the verification server apparatus, and stores the first ingredient analysis result of analyzing the ingredient of the food product at transit upon making the first ingredient analysis result corresponding to the verification information verifying the transit location and the transit time in the distribution process of the food product, generated by the verification server apparatus, and the read part reads the first ingredient analysis result corresponding to the verification information inputted by the input part, from the storage part.

The food product trace apparatus further includes:

a link setting part to set a link between verification information adjoining in accordance with an order of the time verified by the verification information stored in the storage part, wherein the read part reads the first ingredient analysis result corresponding to the verification information inputted by the input part, and a first ingredient analysis result corresponding to verification information to which a link with the verification information inputted by the input part is set by the link setting part, from the storage part, the comparison part compares, by using the processing device, two first ingredient analysis results read by the read part, and the output part outputs the comparison result of the comparison part, the shipment location information indicating the shipment location verified by the verification information inputted by the input part, and shipment location information indicating a shipment location verified by the verification information to which the link with the verification information inputted by the input part is set by the link setting part.

Either one of the food product and packing of the food product has an attached label displaying a bar code by which the verification information is encoded, and the input part inputs the verification information upon reading the verification information from the bar code by using a bar code reader.

Moreover, a food product trace system according to the present invention includes:

a verification server apparatus to generate verification information verifying a shipment location of a food product; and a food product trace apparatus including a storage part to store a first ingredient analysis result of analyzing an ingredient of the food product, an input part to input the verification information generated by the verification server apparatus, and a second ingredient analysis result of analyzing the ingredient of the food product after shipment of the food product, a read part to read the first ingredient analysis result of the food product shipped at the shipment location verified by the verification information inputted by the input part, from the storage part, a comparison part to compare, by using a processing device, the first ingredient analysis result read by the read part with the second ingredient analysis result inputted by the input part, and an output part to output a comparison result of the comparison part and shipment location information indicating the shipment location verified by the verification information inputted by the input part.

The first ingredient analysis result is a result of analyzing the ingredient of the food product at shipment of the food product, the storage part included in the food product trace apparatus stores the first ingredient analysis result upon making the first ingredient analysis result corresponding to the verification information generated by the verification server apparatus, and the read part included in the food product trace apparatus reads the first ingredient analysis result corresponding to the verification information inputted by the input part, from the storage part.

The first ingredient analysis result is a result of analyzing the ingredient of the food product for each shipment location of the food product, and the read part included in the food product trace apparatus reads the first ingredient analysis result corresponding to the shipment location verified by the verification information inputted by the input part, from the storage part.

The verification information is information verifying a shipment location and a shipment time of the food product, and the output part included in the food product trace apparatus outputs the comparison result of the comparison part and information indicating the shipment location and the shipment time verified by the verification information inputted by the input part.

The first ingredient analysis result is a result of analyzing the ingredient of the food product for each shipment location and freshness degree of the food product, and the read part included in the food product trace apparatus judges a freshness degree of the food product based on the shipment time verified by the verification information inputted by the input part, and reads the first ingredient analysis result corresponding to the shipment location verified by the verification information inputted by the input part and the freshness degree judged, from the storage part.

The shipment location includes a production location of the food product and a transit location in a distribution process of the food product, the shipment time includes a shipment time at the production location, and a transit time at the transit location, the verification information is information verifying a position and a time, the storage part included in the food product trace apparatus stores the first ingredient analysis result of analyzing the ingredient of the food product at shipment of the food product upon making the first ingredient analysis result corresponding to the verification information verifying the production location and the shipment time of the food product, generated by the verification server apparatus, and stores the first ingredient analysis result of analyzing the ingredient of the food product at transit upon making the first ingredient analysis result corresponding to the verification information verifying the transit location and the transit time in the distribution process of the food product, generated by the verification server apparatus, and the read part included in the food product trace apparatus reads the first ingredient analysis result corresponding to the verification information inputted by the input part, from the storage part.

The food product trace apparatus further includes a link setting part to set a link between verification information adjoining in accordance with an order of the time verified by the verification information stored in the storage part, the read part included in the food product trace apparatus reads the first ingredient analysis result corresponding to the verification information inputted by the input part, and a first ingredient analysis result corresponding to verification information to which a link with the verification information inputted by the input part is set by the link setting part, from the storage part, the comparison part included in the food product trace apparatus compares, by using the processing device, two first ingredient analysis results read by the read part, and the output part included in the food product trace apparatus outputs the comparison result of the comparison part, the shipment location information indicating the shipment location verified by the verification information inputted by the input part, and shipment location information indicating a shipment location verified by the verification information to which the link with the verification information inputted by the input part is set by the link setting part.

Either one of the food product and packing of the food product has an attached label displaying a bar code by which the verification information is encoded, and the input part included in the food product trace apparatus inputs the verification information upon reading the verification information from the bar code by using a bar code reader.

The verification server apparatus generates the verification information by synthesizing information indicating a position and a time and unique data obtained only at either one of the position and the time.

Moreover, a food product trace method according to the present invention includes:

generating verification information verifying a shipment location of a food product, by a verification server apparatus;

storing the verification information generated by the verification server apparatus, shipment sender information indicating a shipment sender of the food product, and registration information indicating whether the shipment sender has previously registered an ingredient analysis result of analyzing an ingredient of the food product, upon making the verification information, the shipment sender information, and the registration information mutually corresponding, by a storage part included in a food product trace apparatus;

inputting the verification information generated by the verification server apparatus, by an input part included in the food product trace apparatus;

reading the shipment sender information and the registration information corresponding to the verification information inputted by the input part, from the storage part, by a read part included in the food product trace apparatus; and outputting shipment location information indicating the shipment location verified by the verification information inputted by the input part, and the shipment sender information and the registration information read by the read part, by an output part included in the food product trace apparatus.

Moreover, a food product trace method according to the present invention includes:

generating verification information verifying a shipment location of a food product, by a verification server apparatus;

storing a first ingredient analysis result of analyzing an ingredient of the food product, by a storage part included in a food product trace apparatus;

inputting the verification information generated by the verification server apparatus, and a second ingredient analysis result of analyzing the ingredient of the food product after shipment of the food product, by an input part included in the food product trace apparatus;

reading the first ingredient analysis result of the food product shipped at the shipment location verified by the verification information inputted by the input part, from the storage part, by a read part included in the food product trace apparatus;

comparing, by using a processing device, the first ingredient analysis result read by the read part with the second ingredient analysis result inputted by the input part, by a comparison part included in the food product trace apparatus; and outputting a comparison result of the comparison part and shipment location information indicating the shipment location verified by the verification information inputted by the input part, by an output part included in the food product trace apparatus.

The first ingredient analysis result is a result of analyzing the ingredient of the food product at shipment of the food product, and the food product trace method includes storing the first ingredient analysis result upon making the first ingredient analysis result corresponding to the verification information generated by the verification server apparatus, by the storage part included in the food product trace apparatus, and reading the first ingredient analysis result corresponding to the verification information inputted by the input part, from the storage part, by the read part included in the food product trace apparatus.

The first ingredient analysis result is a result of analyzing the ingredient of the food product for each shipment location of the food product, and the food product trace method includes reading the first ingredient analysis result corresponding to the shipment location verified by the verification information inputted by the input part, from the storage part, by the read part included in the food product trace apparatus.

EFFECTS OF THE PRESENT INVENTION

According to the present invention, in the food product trace apparatus, the storage part stores verification information verifying a shipment location of a food product, generated by a verification server apparatus which generates the verification information, shipment sender information indicating a shipment sender of the food product, and registration information indicating whether the shipment sender has previously registered an ingredient analysis result of analyzing an ingredient of the food product, upon making the verification information, the shipment sender information, and the registration information mutually corresponding;

the input part inputs the verification information generated by the verification server apparatus;

the read part reads the shipment sender information and the registration information corresponding to the verification information inputted by the input part, from the storage part; and the output part outputs shipment location information indicating the shipment location verified by the verification information inputted by the input part, and the shipment sender information and the registration information read by the read part.

Then, it becomes possible to easily check whether information about a shipment location of a food product is reliable or not.

Moreover, the verification information is information verifying a shipment location and a shipment time of a food product, and the output part outputs information indicating the shipment location and the shipment time verified by the verification information inputted by the input part, and the shipment sender information and the registration information read by the read part. Then, it becomes possible to easily check whether information about a shipment location and a shipment time of a food product is reliable or not.

Moreover, according to the present invention, in the food product trace apparatus, the storage part stores a first ingredient analysis result of analyzing an ingredient of a food product;

the input part inputs verification information verifying a shipment location of the food product, generated by a verification server apparatus which generates the verification information, and a second ingredient analysis result of analyzing the ingredient of the food product after shipment of the food product;

the read part reads the first ingredient analysis result of the food product shipped at the shipment location verified by the verification information inputted by the input part, from the storage part;

the comparison part compares, by using a processing device, the first ingredient analysis result read by the read part with the second ingredient analysis result inputted by the input part; and the output part outputs a comparison result of the comparison part and shipment location information indicating the shipment location verified by the verification information inputted by the input part.

Then, it becomes possible to easily check whether information about a shipment location of a food product is correct or not.

Moreover, the first ingredient analysis result is a result of analyzing the ingredient of the food product at shipment of the food product, the storage part stores the first ingredient analysis result upon making the first ingredient analysis result corresponding to the verification information generated by the verification server apparatus, and the read part reads the first ingredient analysis result corresponding to the verification information inputted by the input part, from the storage part. Then, it becomes possible to individually check whether information about a shipment location of a food product is correct or not, with respect to each shipped food product.

Moreover, the first ingredient analysis result is a result of analyzing the ingredient of the food product for each shipment location of the food product, and the read part reads the first ingredient analysis result corresponding to the shipment location verified by the verification information inputted by the input part, from the storage part. Then, it becomes possible to check, after shipment, whether information about a shipment location of a food product is correct or not, even if an ingredient analysis is not individually performed with respect to each food product to be shipped.

Moreover, the verification information is information verifying a shipment location and a shipment time of the food product, and the output part outputs the comparison result of the comparison part and information indicating the shipment location and the shipment time verified by the verification information inputted by the input part. Then, it becomes possible to easily check whether information about a shipment location and a shipment time of a food product is correct or not.

Moreover, the first ingredient analysis result is a result of analyzing the ingredient of the food product for each shipment location and freshness degree of the food product, and the read part judges a freshness degree of the food product based on the shipment time verified by the verification information inputted by the input part, and reads the first ingredient analysis result corresponding to the shipment location verified by the verification information inputted by the input part and the freshness degree judged, from the storage part. Then, it becomes possible to check, after shipment, whether information about a shipment location and a shipment time of a food product is correct or not, even if an ingredient analysis is not individually performed with respect to each food product to be shipped.

Moreover, the verification information is information verifying a position and a time, the storage part stores the first ingredient analysis result of analyzing the ingredient of the food product at shipment of the food product upon making the first ingredient analysis result corresponding to the verification information verifying the production location and the shipment time of the food product, generated by the verification server apparatus, and stores the first ingredient analysis result of analyzing the ingredient of the food product at transit upon making the first ingredient analysis result corresponding to the verification information verifying the transit location and the transit time in the distribution process of the food product, generated by the verification server apparatus, and the read part reads the first ingredient analysis result corresponding to the verification information inputted by the input part, from the storage part. Then, it becomes possible to check whether information about each shipment location and shipment time is correct or not, based on verification information acquired at each of a plurality of locations in a distribution process of a food product.

Moreover, the link setting part sets a link between verification information adjoining in accordance with an order of the time verified by the verification information stored in the storage part, the read part reads the first ingredient analysis result corresponding to the verification information inputted by the input part, and a first ingredient analysis result corresponding to verification information to which a link with the verification information inputted by the input part is set by the link setting part, from the storage part, the comparison part compares, by using the processing device, two first ingredient analysis results read by the read part, and the output part outputs the comparison result of the comparison part, the shipment location information indicating the shipment location verified by the verification information inputted by the input part, and shipment location information indicating a shipment location verified by the verification information to which the link with the verification information inputted by the input part is set by the link setting part.

Then, it becomes possible to check whether information about a shipment location and a shipment time at each of a plurality of locations in a distribution process of a food product is correct or not, based on verification information acquired at one location in the distribution process of the food product.

Moreover, either one of the food product and packing of the food product has an attached label displaying a bar code by which the verification information is encoded, and the input part inputs the verification information upon reading the verification information from the bar code by using a bar code reader. Then, it becomes possible to save time and effort of inputting by hand.

Moreover, according to the present invention, in the food product trace system, the storage part included in the food product trace apparatus stores a first ingredient analysis result of analyzing an ingredient of the food product, the input part inputs the verification information generated by the verification server apparatus, and a second ingredient analysis result of analyzing the ingredient of the food product after shipment of the food product, the read part reads the first ingredient analysis result of the food product shipped at the shipment location verified by the verification information inputted by the input part, from the storage part, the comparison part compares, by using a processing device, the first ingredient analysis result read by the read part with the second ingredient analysis result inputted by the input part, and the output part outputs a comparison result of the comparison part and shipment location information indicating the shipment location verified by the verification information inputted by the input part.

Then, it becomes possible to easily check whether information about a shipment location of a food product is correct or not.

Moreover, the first ingredient analysis result is a result of analyzing the ingredient of the food product at shipment of the food product, the storage part included in the food product trace apparatus stores the first ingredient analysis result upon making the first ingredient analysis result corresponding to the verification information generated by the verification server apparatus, and the read part reads the first ingredient analysis result corresponding to the verification information inputted by the input part, from the storage part. Then, it becomes possible to individually check whether information about a shipment location of a food product is correct or not, with respect to each shipped food product.

Moreover, the first ingredient analysis result is a result of analyzing the ingredient of the food product for each shipment location of the food product, and the read part included in the food product trace apparatus reads the first ingredient analysis result corresponding to the shipment location verified by the verification information inputted by the input part, from the storage part. Then, it becomes possible to check, after shipment, whether information about a shipment location of a food product is correct or not, even if an ingredient analysis is not individually performed with respect to each food product to be shipped.

Moreover, the verification information is information verifying a shipment location and a shipment time of the food product, and the output part included in the food product trace apparatus outputs the comparison result of the comparison part and information indicating the shipment location and the shipment time verified by the verification information inputted by the input part. Then, it becomes possible to easily check whether information about a shipment location and a shipment time of a food product is correct or not.

Moreover, the first ingredient analysis result is a result of analyzing the ingredient of the food product for each shipment location and freshness degree of the food product, and the read part included in the food product trace apparatus judges a freshness degree of the food product based on the shipment time verified by the verification information inputted by the input part, and reads the first ingredient analysis result corresponding to the shipment location verified by the verification information inputted by the input part and the freshness degree judged, from the storage part. Then, it becomes possible to check, after shipment, whether information about a shipment location and a shipment time of a food product is correct or not, even if an ingredient analysis is not individually performed with respect to each food product to be shipped.

Moreover, the verification information is information verifying a position and a time, the storage part included in the food product trace apparatus stores the first ingredient analysis result of analyzing the ingredient of the food product at shipment of the food product upon making the first ingredient analysis result corresponding to the verification information verifying the production location and the shipment time of the food product, generated by the verification server apparatus, and stores the first ingredient analysis result of analyzing the ingredient of the food product at transit upon making the first ingredient analysis result corresponding to the verification information verifying the transit location and the transit time in the distribution process of the food product, generated by the verification server apparatus, and the read part reads the first ingredient analysis result corresponding to the verification information inputted by the input part, from the storage part. Then, it becomes possible to check whether information about each shipment location and shipment time is correct or not, based on verification information acquired at each of a plurality of locations in a distribution process of a food product.

Moreover, the link setting part included in the food product trace apparatus sets a link between verification information adjoining in accordance with an order of the time verified by the verification information stored in the storage part, the read part reads the first ingredient analysis result corresponding to the verification information inputted by the input part, and a first ingredient analysis result corresponding to verification information to which a link with the verification information inputted by the input part is set by the link setting part, from the storage part, the comparison part compares, by using the processing device, two first ingredient analysis results read by the read part, and the output part outputs the comparison result of the comparison part, the shipment location information indicating the shipment location verified by the verification information inputted by the input part, and shipment location information indicating a shipment location verified by the verification information to which the link with the verification information inputted by the input part is set by the link setting part.

Then, it becomes possible to check whether information about a shipment location and a shipment time at each of a plurality of locations in a distribution process of a food product is correct or not, based on verification information acquired at one location in the distribution process of the food product.

Moreover, either one of the food product and packing of the food product has an attached label displaying a bar code by which the verification information is encoded, and the input part included in the food product trace apparatus inputs the verification information upon reading the verification information from the bar code by using a bar code reader. Then, it becomes possible to save time and effort of inputting by hand.

Moreover, the verification server apparatus generates the verification information by synthesizing information indicating a position and a time and unique data obtained only at either one of the position and the time. Then, probative value of verification information is improved.

Moreover, according to the present invention, in the food product trace method, the storage part included in the food product trace apparatus stores the verification information generated by the verification server apparatus, shipment sender information indicating a shipment sender of the food product, and registration information indicating whether the shipment sender has previously registered an ingredient analysis result of analyzing an ingredient of the food product, upon making the verification information, the shipment sender information, and the registration information mutually corresponding;

the input part inputs the verification information generated by the verification server apparatus;

the read part reads the shipment sender information and the registration information corresponding to the verification information inputted by the input part, from the storage part;

the comparison part compares, by using a processing device, the first ingredient analysis result read by the read part with the second ingredient analysis result inputted by the input part; and the output part outputs shipment location information indicating the shipment location verified by the verification information inputted by the input part, and the shipment sender information and the registration information read by the read part.

Then, it becomes possible to easily check whether information about a shipment location of a food product is reliable or not.

Moreover, according to the present invention, in the food product trace method, the storage part included in the food product trace apparatus stores a first ingredient analysis result of analyzing an ingredient of the food product;

the input part inputs the verification information generated by the verification server apparatus, and a second ingredient analysis result of analyzing the ingredient of the food product after shipment of the food product;

the read part reads the first ingredient analysis result of the food product shipped at the shipment location verified by the verification information inputted by the input part, from the storage part;

the comparison part compares, by using a processing device, the first ingredient analysis result read by the read part with the second ingredient analysis result inputted by the input part; and the output part outputs a comparison result of the comparison part and shipment location information indicating the shipment location verified by the verification information inputted by the input part.

Then, it becomes possible to easily check whether information about a shipment location of a food product is correct or not.

Moreover, the first ingredient analysis result is a result of analyzing the ingredient of the food product at shipment of the food product, the storage part included in the food product trace apparatus stores the first ingredient analysis result upon making the first ingredient analysis result corresponding to the verification information generated by the verification server apparatus, and the read part included in the food product trace apparatus reads the first ingredient analysis result corresponding to the verification information inputted by the input part, from the storage part. Then, it becomes possible to individually check whether information about a shipment location of a food product is correct or not, with respect to each shipped food product.

Moreover, the first ingredient analysis result is a result of analyzing the ingredient of the food product for each shipment location of the food product, and the read part included in the food product trace apparatus reads the first ingredient analysis result corresponding to the shipment location verified by the verification information inputted by the input part, from the storage part. Then, it becomes possible to check, after shipment, whether information about a shipment location of a food product is correct or not, even if an ingredient analysis is not individually performed with respect to each food product to be shipped.

BEST MODE FOR CARRYING OUT THE INVENTION

Embodiments of the present invention will be explained with reference to figures hereinafter.

In the following description, each of a production location and a transit location of a food product is an example of a shipment location. Each of a date of manufacture and a date and time of shipment of a food product is an example of a shipment time. Moreover, each of a producer, a distributor, and a retailer of a food product is an example of a shipment sender.

FIG. 1 shows a conceptual diagram illustrating a distribution process of a food product.

Tomato A, tomato B, and tomato C are all examples of food products whose qualities and prices vary depending upon production locations. It is supposed that tomato A produced in a production location A is 100 yen per each, tomato B produced in a production location B is 200 yen per each, and tomato C produced in a production location C is 500 yen per each. In this example, the producer of tomato A ships tomato A with attaching no label or a label only displaying "production location A" by the conventional method. A distributor or a retailer makes himself a label of tomato C having a higher price than tomato A per each, namely a label of displaying "production location C", by using a printer, and attaches the label to tomato A. Referring to the label attached to tomato A, a purchaser who expects to buy tomato C judges that the tomato is tomato C, and will buy tomato A having mislabeled as tomato C.

FIG. 2 shows a conceptual diagram illustrating a distribution process of a food product according to each Embodiment explained below.

Tomato A, tomato B, and tomato C are all examples of food products whose qualities and prices vary depending upon production locations. Similarly to the example of FIG. 1, it is supposed that tomato A produced in production location A is 100 yen per each, tomato B produced in production location B is 200 yen per each, and tomato C produced in production location C is 500 yen per each. In this example, the producer of tomato A sends a sample of tomato A to an ingredient analysis center beforehand. The ingredient analysis center analyzes ingredient of the sent sample of tomato A, and registers a result of the ingredient analysis in a database etc. By having registered the ingredient analysis result of tomato A at the ingredient analysis center, the producer of tomato A becomes an ingredient analysis registrant (or just called a registrant) of tomato A. At the time of shipment of tomato A, a verification code (an example of verification information) verifying a shipment location and a shipment time (or only a shipment location) is issued to the producer of tomato A from an information storage center offering the service of verifying position and time (or only position). This verification code is stored in the database etc. of the information storage center, with information of the corresponding registrant and the ingredient analysis result of the corresponding food product (or an identifier for specifying them). Thereby, by using the verification code as a key, it is possible to specify the registrant or to refer to the ingredient analysis result of the food product.

The producer of tomato A ships tomato A with attaching a label displaying not only "production location A" but also the verification code issued by the information storage center. A distributor or a retailer is not able to make himself a label of tomato C having higher price than tomato A per each, namely a label displaying "production location C", further with displaying a verification code issued to the producer of the tomato C. Even if a label displaying such verification code is made and attached to tomato A, a purchaser who wants to purchase tomato C is able to check whether the tomato is truly tomato C or not, by sending a sample of the tomato to be purchased to the ingredient analysis center to request an ingredient analysis. That is, even if a label displaying falsehood is attached, it becomes impossible to mislabel tomato A as tomato C. Moreover, even if a purchaser does not request an ingredient analysis every time when purchasing a food product, the fact that verification of a production location can be performed by an ingredient analysis becomes a psychological pressure to those who are going to mislabel food products, which has an effect on preventing a dishonest act of fraudulent labeling of a production location or a date of manufacture of a food product. In order to enhance such effect, it is also acceptable to have a display with which it can be visually checked that the ingredient analysis result of the food product has been registered in the database etc. of the ingredient analysis center, on the label attached to the food product shipped by the ingredient analysis registrant. For example, instead of a usual method of displaying a verification code in a black character or image (bar code etc.) on the label attached to a food product, a method of displaying the verification code in a golden character or image can be used.

As a method of the above ingredient analysis, the technology of the company Agrosom GmbH (website URL <http://www.agrosom.de/>) of Germany can be used, for example. In this technology relating to the ingredient analysis, an isotopic analysis of natural water is used. In the natural water analysis, it is possible to judge from which location each of natural waters of plural different locations comes, by utilizing the fact that stable isotopes having different mass numbers (atomic masses) exist in the oxygen (O) and the hydrogen (H) of natural water ($H_2O$). Similarly, in an ingredient analysis of a food product, it is possible to judge the production location of the food product. Moreover, a freshness degree of a food product can be judged by the same method. As another method of the ingredient analysis, a DNA (deoxyribonucleic acid) analysis etc. of a food product can also be utilized.

Embodiment 1

FIG. 3 is a block diagram showing a configuration of a food product trace system according to the present Embodiment.

In the present Embodiment, a food product trace system 100 includes a food product trace apparatus 200, a verification server apparatus 300, a terminal apparatus 400a used by a purchaser 401, and a terminal apparatus 400b used by a producer 402 (an example of a shipment sender). The food product trace apparatus 200, the verification server apparatus 300, the terminal apparatus 400a, and the terminal apparatus 400b mutually communicate through a network 150. The network 150 may include two or more independent networks. For example, it is acceptable that the network 150 includes two independent WANs (Wide Area Networks), the food product trace apparatus 200 and the terminal apparatus 400b are connected through the first WAN, and the verification server apparatus 300 and the terminal apparatus 400b are connected through the second WAN. (In this case, in order for the food product trace apparatus 200 and the verification server apparatus 300 to communicate mutually, for example, it is necessary for the food product trace apparatus 200 and the verification server apparatus 300 to be connected to a LAN (Local Area Network), for the food product trace apparatus 200 to be connected to the second WAN, or for the verification server apparatus 300 to be connected to the first WAN.)

The food product trace apparatus 200 includes a CPU (Central Processing Unit) 201 (an example of a processing device), a storage part 202, an input part 203, a read part 204, and an output part 205. The food product trace apparatus 200 is installed in the information storage center shown in FIG. 2, for example. The storage part 202 included in the food product trace apparatus 200 contains the database etc. of the information storage center mentioned above. Moreover, the storage part 202 may also include the database etc. of the ingredient analysis center mentioned above, and may acquire and store a verification code and corresponding information of a registrant (or an identifier for specifying the information of the registrant) from the database etc. of the ingredient analysis center. When the storage part 202 stores an identifier, for example, information of the registrant stored in the database etc. of the ingredient analysis center is referred to based on the identifier, and is outputted by the output part 205.

The verification server apparatus 300 is installed in the information storage center shown in FIG. 2 and provides service of verifying time and position. As this service, the method described in the Patent Document 2 (in concrete terms, COCO-DATES (registered trademark) service) can be utilized, or a method that generates irreversible data of fixed length by using a hash function etc. for the information indicating time and position and uses the data of fixed length as the data for verification can also be utilized. According to the present Embodiment, it is supposed that the verification server apparatus 300 verifies time and position by using the method described in the Patent Document 2, and the verification server apparatus 300 uses weather data (an example of a unique data obtained only at a predetermined time (shipment date and time of a food product, etc.)), as the temporal change information.

The terminal apparatus 400b of the producer 402 receives time information and position information from a GPS (Global Positioning System) satellite 151 etc. In order to make the verification server apparatus 300 generate a verification code (in the case of utilizing COCO-DATES (registered trademark) service, a COCO-DATES (registered trademark) code) based on time information and position information received, the terminal apparatus 400b transmits these pieces of information to the verification server apparatus 300. The verification server apparatus 300 receives weather data from a weather satellite 152 (it is also acceptable to receive via another apparatus instead of directly receiving from the weather satellite 152), and generates a verification code by synthesizing the time information and the position information received from the terminal apparatus 400b and the weather data received from the weather satellite 152. In this case, it is also acceptable to synthesize natural phenomenon information (an example of a unique data obtained only at a predetermined position (a production location of a food product, etc.)), such as temperature, humidity, atmospheric pressure, altitude, and wind velocity, in addition to the weather data.

FIG. 4 is a flowchart showing an operation of the food product trace apparatus (an example of a food product trace method) according to the present Embodiment.

First, the producer 402 registers an ingredient analysis result of a food product in the database etc. of the ingredient analysis center. The terminal apparatus 400b of the producer 402 acquires a verification code verifying a production location and a shipment date and time of the food product, from the verification server apparatus 300, at the shipment of the food product, by the method mentioned above.

The storage part 202 included in the food product trace apparatus 200 stores the verification code generated by the verification server apparatus 300, shipment sender information indicating the producer 402 (for example, information for specifying the producer 402 or information relating to the producer 402), and registration information indicating whether the producer 402 has previously registered an ingredient analysis result of the food product, upon making the verification code, the shipment sender information, and the registration information mutually corresponding (Step S101). As to the verification code, it may be inputted by the input part 203 or the storage part 202 may acquire it from the verification server apparatus 300 or the terminal apparatus 400b through the network 150. Moreover, as to the shipment sender information and the registration information, they may be inputted by the input part 203, or the storage part 202 may acquire them from the database etc. of the ingredient analysis center or the terminal apparatus 400b through the network 150.

Next, the producer 402 attaches a label displaying the verification code to the food product, and ships the food product. The food product will be put in a shop front through a distribution process.

The input part 203 included in the food product trace apparatus 200 inputs the verification code generated by the verification server apparatus 300 (Step S102). As to the verification code, the input part 203 acquires it from the purchaser 401 (or its terminal apparatus 400a) by communication etc. When a bar code by which the verification code is encoded is displayed on the label of the food product, the input part 203 may read the verification code from the bar code by using a bar code reader, or the input part 203 may acquire the verification code read from the bar code by using a bar code reader (for example, a bar code reader installed in the terminal apparatus 400a of the purchaser 401), from the terminal apparatus 400a through the network 150.

The read part 204 included in the food product trace apparatus 200 reads the shipment sender information and the registration information corresponding to the verification code inputted by the input part 203, from the storage part 202 (Step S103). The output part 205 outputs information (shipment location information and shipment time information) indicating the production location and the shipment date and time of the food product verified by the verification code inputted by the input part 203, and the shipment sender information and the registration information read by the read part 204 (Step S104). The information outputted by the output part 205 is acquired by the terminal apparatus 400a of the purchaser 401 through the network 150 for example, and is outputted. Thereby, the purchaser 401 can check the production location, the shipment date and time, and the producer 402 of the food product, and check whether the producer 402 has previously registered the ingredient analysis result of the food product or not, and can purchase the food product at ease.

As stated above, the food product trace apparatus according to the present Embodiment includes:

a storage part to store verification information verifying a shipment location of a food product, generated by a verification server apparatus which generates the verification information, shipment sender information indicating a shipment sender of the food product, and registration information indicating whether the shipment sender has previously registered an ingredient analysis result of analyzing an ingredient of the food product, upon making the verification information, the shipment sender information, and the registration information mutually corresponding;

an input part to input the verification information generated by the verification server apparatus;

a read part to read the shipment sender information and the registration information corresponding to the verification information inputted by the input part, from the storage part; and an output part to output shipment location information indicating the shipment location verified by the verification information inputted by the input part, and the shipment sender information and the registration information read by the read part.

The above feature makes it possible to easily check whether information about a shipment location of a food product is reliable or not.

The verification information is information verifying a shipment location and a shipment time of a food product, and the output part outputs information indicating the shipment location and the shipment time verified by the verification information inputted by the input part, and the shipment sender information and the registration information read by the read part.

The above feature makes it possible to easily check whether information about a shipment location and a shipment time of a food product is reliable or not.

Either one of the food product and packing of the food product has an attached label displaying a bar code by which the verification information is encoded, and the input part inputs the verification information upon reading the verification information from the bar code by using a bar code reader.

The above feature makes it possible to save time and effort of inputting by hand.

Moreover, the food product trace system according to the present Embodiment includes a verification server apparatus to generate verification information verifying a shipment location of a food product, and a food product trace apparatus including a storage part to store verification information generated by the verification server apparatus, shipment sender information indicating a shipment sender of the food product, and registration information indicating whether the shipment sender has previously registered an ingredient analysis result of analyzing an ingredient of the food product, upon making the verification information, the shipment sender information, and the registration information mutually corresponding;

an input part to input the verification information generated by the verification server apparatus;

a read part to read the shipment sender information and the registration information corresponding to the verification information inputted by the input part, from the storage part; and an output part to output shipment location information indicating the shipment location verified by the verification information inputted by the input part, and the shipment sender information and the registration information read by the read part.

The above feature makes it possible to easily check whether information about a shipment location of a food product is reliable or not.

Either one of the food product and packing of the food product has an attached label displaying a bar code by which the verification information is encoded, and the input part included in the food product trace apparatus inputs the verification information upon reading the verification information from the bar code by using a bar code reader.

The above feature makes it possible to save time and effort of inputting by hand.

The verification server apparatus generates the verification information by synthesizing information indicating a position and a time and unique data obtained only at either one of the position and the time.

The above feature improves probative value of verification information.

Moreover, the food product trace method according to the present Embodiment includes:

generating verification information verifying a shipment location of a food product, by a verification server apparatus;

storing the verification information generated by the verification server apparatus, shipment sender information indicating a shipment sender of the food product, and registration information indicating whether the shipment sender has previously registered an ingredient analysis result of analyzing an ingredient of the food product, upon making the verification information, the shipment sender information, and the registration information mutually corresponding, by a storage part included in a food product trace apparatus;

inputting the verification information generated by the verification server apparatus, by an input part included in the food product trace apparatus;

reading the shipment sender information and the registration information corresponding to the verification information inputted by the input part, from the storage part, by a read part included in the food product trace apparatus; and outputting shipment location information indicating the shipment location verified by the verification information inputted by the input part, and the shipment sender information and the registration information read by the read part, by an output part included in the food product trace apparatus.

The above feature makes it possible to easily check whether information about a shipment location of a food product is reliable or not.

Embodiment 2

FIG. 5 is a block diagram showing a configuration of a food product trace system according to the present Embodiment.

The food product trace apparatus 200 includes a comparison part 206. Other configuration is the same as that of Embodiment 1 described referring to FIG. 3. The storage part 202 included in the food product trace apparatus 200 includes the database etc. of the information storage center mentioned above. Moreover, the storage part 202 may also include the database etc. of the ingredient analysis center mentioned above, and may acquire and store a verification code and corresponding information of a registrant or a corresponding ingredient analysis result of a food product (or an identifier for specifying them), from the database etc. of the ingredient analysis center. In the case the storage part 202 stores an identifier, for example, the information of the registrant and the ingredient analysis result of the food product stored in the database etc. of the ingredient analysis center are referred to based on the identifier, and are outputted by the output part 205.

FIG. 6 is a flowchart showing an operation of the food product trace apparatus (an example of the food product trace method) according to the present Embodiment.

First, the producer 402 registers an ingredient analysis result (first ingredient analysis result) of a food product in the database etc. of the ingredient analysis center. The terminal apparatus 400b of the producer 402 acquires a verification code verifying the production location and the shipment date and time of the food product, from the verification server apparatus 300, at the shipment of the food product, by the method mentioned above.

The storage part 202 included in the food product trace apparatus 200 stores the first ingredient analysis result upon making the first ingredient analysis result corresponding to the verification code generated by the verification server apparatus 300 (Step S201). As to the verification code, it may be inputted by the input part 203, or the storage part 202 may acquire it from the verification server apparatus 300 or the terminal apparatus 400b through the network 150. Moreover, as to the first ingredient analysis result, it may be inputted by the input part 203, or the storage part 202 may acquire it from the database etc. of the ingredient analysis center through the network 150.

Next, the producer 402 attaches a label displaying the verification code to the food product, and ships the food product. The food product will be put in a shop front through a distribution process.

The input part 203 included in the food product trace apparatus 200 inputs the verification code generated by verification server apparatus 300 and a second ingredient analysis result of analyzing the ingredient of the food product after shipment of the food product (for example, when it is put in a shop front) (Step S202). As to the verification code, the input part 203 acquires it from the purchaser 401 (or its terminal apparatus 400a) by communication etc. When a bar code by which the verification code is encoded is displayed on the label of the food product, the input part 203 may read the verification code from the bar code by using a bar code reader, or the input part 203 may acquire the verification code read from the bar code by using a bar code reader (for example, a bar code reader installed in the terminal apparatus 400a of the purchaser 401), from the terminal apparatus 400a through the network 150.

Moreover, as to the second ingredient analysis result, the input part 203 acquires it from the ingredient analysis center (for example, database etc. of the ingredient analysis center) by communication etc. (In this case, the purchaser 401 sends the food product or a part of the food product to the ingredient analysis center and requests an ingredient analysis of the food product. The ingredient analysis center performs the ingredient analysis of the food product in response to this request, and obtains the second ingredient analysis result.) In the case the ingredient analysis is performed at other than the ingredient analysis center, such as at a shop front, the input part 203 may acquire the second ingredient analysis result from a device, etc. which outputs the result of the ingredient analysis, through the network 150.

The read part 204 included in the food product trace apparatus 200 reads the first ingredient analysis result corresponding to the verification code inputted by the input part 203, from the storage part 202 (Step S203). The comparison part 206 compares the first ingredient analysis result read by the read part 204 with the second ingredient analysis result inputted by the input part 203, by using the CPU 201 (Step S204). The output part 205 outputs a comparison result of the comparison part 206 and information (shipment location information and shipment time information) indicating the production location and the shipment date and time of the food product verified by the verification code inputted by the input part 203 (Step S205). The information outputted by the output part 205 is acquired by the terminal apparatus 400a of the purchaser 401 through the network 150 for example, and is outputted. Thereby, the purchaser 401 can check the production location and the shipment date and time of the food product, and check whether the food product was produced truly in the production location or not, and can purchase the food product at ease.

As mentioned above, the food product trace apparatus according to the resent Embodiment includes:

a storage part to store a first ingredient analysis result of analyzing an ingredient of a food product;

an input part to input verification information verifying a shipment location of the food product, generated by a verification server apparatus which generates the verification information, and a second ingredient analysis result of analyzing the ingredient of the food product after shipment of the food product;

a read part to read the first ingredient analysis result of the food product shipped at the shipment location verified by the verification information inputted by the input part, from the storage part;

a comparison part to compare, by using a processing device, the first ingredient analysis result read by the read part with the second ingredient analysis result inputted by the input part; and an output part to output a comparison result of the comparison part and shipment location information indicating the shipment location verified by the verification information inputted by the input part.

The above feature makes it possible to easily check whether information about a shipment location of a food product is correct or not.

The first ingredient analysis result is a result of analyzing the ingredient of the food product at shipment of the food product, the storage part stores the first ingredient analysis result upon making the first ingredient analysis result corresponding to the verification information generated by the verification server apparatus, and the read part reads the first ingredient analysis result corresponding to the verification information inputted by the input part, from the storage part.

The above feature makes it possible to individually check whether information about a shipment location of a food product is correct or not, with respect to each shipped food product.

The verification information is information verifying a shipment location and a shipment time of the food product, and the output part outputs the comparison result of the comparison part and information indicating the shipment location and the shipment time verified by the verification information inputted by the input part.

The above feature makes it possible to easily check whether information about a shipment location and a shipment time of a food product is correct or not.

Either one of the food product and packing of the food product has an attached label displaying a bar code by which the verification information is encoded, and the input part inputs the verification information upon reading the verification information from the bar code by using a bar code reader.

The above feature makes it possible to save time and effort of inputting by hand.

Moreover, the food product trace system according to the present Embodiment includes:

a verification server apparatus to generate verification information verifying shipment location of a food product; and a food product trace apparatus including a storage part to store a first ingredient analysis result of analyzing an ingredient of the food product, an input part to input the verification information generated by the verification server apparatus, and a second ingredient analysis result of analyzing the ingredient of the food product after shipment of the food product, a read part to read the first ingredient analysis result of the food product shipped at the shipment location verified by the verification information inputted by the input part, from the storage part, a comparison part to compare, by using a processing device, the first ingredient analysis result read by the read part with the second ingredient analysis result inputted by the input part, and an output part to output a comparison result of the comparison part and shipment location information indicating the shipment location verified by the verification information inputted by the input part.

The above feature makes it possible to easily check whether information about a shipment location of a food product is correct or not.

The first ingredient analysis result is a result of analyzing the ingredient of the food product at shipment of the food product, the storage part included in the food product trace apparatus stores the first ingredient analysis result upon making the first ingredient analysis result corresponding to the verification information generated by the verification server apparatus, and the read part included in the food product trace apparatus reads the first ingredient analysis result corresponding to the verification information inputted by the input part, from the storage part.

The above feature makes it possible to individually check whether information about a shipment location of a food product is correct or not, with respect to each shipped food product.

The verification information is information verifying a shipment location and a shipment time of the food product, and the output part included in the food product trace apparatus outputs the comparison result of the comparison part and information indicating the shipment location and the shipment time verified by the verification information inputted by the input part.

The above feature makes it possible to easily check whether information about a shipment location and a shipment time of a food product is correct or not.

Either one of the food product and packing of the food product has an attached label displaying a bar code by which the verification information is encoded, and the input part included in the food product trace apparatus inputs the verification information upon reading the verification information from the bar code by using a bar code reader.

The above feature makes it possible to save time and effort of inputting by hand.

The verification server apparatus generates the verification information by synthesizing information indicating a position and a time and unique data obtained only at either one of the position and the time.

The above feature improves probative value of verification information.

Moreover, the food product trace method according to the present Embodiment includes:

generating verification information verifying a shipment location of a food product, by a verification server apparatus;

storing a first ingredient analysis result of analyzing an ingredient of the food product, by a storage part included in a food product trace apparatus;

inputting the verification information generated by the verification server apparatus, and a second ingredient analysis result of analyzing the ingredient of the food product after shipment of the food product, by an input part included in the food product trace apparatus;

reading the first ingredient analysis result of the food product shipped at the shipment location verified by the verification information inputted by the input part, from the storage part, by a read part included in the food product trace apparatus;

comparing, by using a processing device, the first ingredient analysis result read by the read part with the second ingredient analysis result inputted by the input part, by a comparison part included in the food product trace apparatus; and outputting a comparison result of the comparison part and shipment location information indicating the shipment location verified by the verification information inputted by the input part, by an output part included in the food product trace apparatus.

The above feature makes it possible to easily check whether information about a shipment location of a food product is correct or not.

The first ingredient analysis result is a result of analyzing the ingredient of the food product at shipment of the food product, and the food product trace method includes storing the first ingredient analysis result upon making the first ingredient analysis result corresponding to the verification information generated by the verification server apparatus, by the storage part included in the food product trace apparatus, and reading the first ingredient analysis result corresponding to the verification information inputted by the input part, from the storage part, by the read part included in the food product trace apparatus.

The above feature makes it possible to individually check whether information about a shipment location of a food product is correct or not, with respect to each shipped food product.

Embodiment 3

As an ingredient analysis method of a food product, a method by which a production location of a food product can be judged based on an ingredient analysis result of the food product (for example, by the natural water analysis mentioned above) is used in the present Embodiment.

The configuration of the food product trace system according to the present Embodiment is the same as that of Embodiment 2 described referring to FIG. 5.

FIG. 7 is a flowchart showing an operation of the food product trace apparatus (an example of the food product trace method) according to the present Embodiment.

First, if necessary, the producer 402 registers an ingredient analysis result (first ingredient analysis result) of a food product in the database etc. of the ingredient analysis center. In the present Embodiment, it is not necessary to perform an ingredient analysis each time at the shipment of the food product. For example, if an ingredient analysis of a food product to be actually shipped is performed and the production location judged from the result of the ingredient analysis will become the same as (or close to) the production location judged from the ingredient analysis result registered in the database etc. of the ingredient analysis center in the past, then the ingredient analysis result registered in the past can be used as substitution.

The terminal apparatus 400b of the producer 402 acquires the verification code verifying the production location and the shipment date and time of the food product from the verification server apparatus 300 at the shipment of the food product, by the method mentioned above.

The storage part 202 included in the food product trace apparatus 200 stores the first ingredient analysis result (Step S301). As to the first ingredient analysis result, it may be inputted by the input part 203, or the storage part 202 may acquire it from the database etc. of the ingredient analysis center through the network 150. The storage part 202 may previously store information indicating correspondence between a plurality of production locations and ingredient analysis results.

Next, the producer 402 attaches a label displaying the verification code to the food product, and ships the food product. The food product will be put in a shop front through a distribution process.

The input part 203 included in the food product trace apparatus 200 inputs the verification code generated by the verification server apparatus 300 and a second ingredient analysis result of analyzing the ingredient of the food product after shipment of the food product (for example, when it is put in a shop front) (Step S302). As to the verification code, the input part 203 acquires it from the purchaser 401 (or its terminal apparatus 400*a*) by communication etc. When a bar code by which the verification code is encoded is displayed on the label of the food product, the input part 203 may read the verification code from the bar code by using a bar code reader, or the input part 203 may acquire the verification code read from the bar code by using a bar code reader (for example, a bar code reader installed in the terminal apparatus 400*a* of the purchaser 401), from the terminal apparatus 400*a* through the network 150.

Moreover, as to the second ingredient analysis result, the input part 203 acquires it from the ingredient analysis center (for example, database etc. of the ingredient analysis center) by communication etc. (In this case, the purchaser 401 sends the food product or a part of the food product to the ingredient analysis center and requests an ingredient analysis of the food product. The ingredient analysis center performs the ingredient analysis of the food product in response to this request, and obtains the second ingredient analysis result.) In the case the ingredient analysis is performed at other than the ingredient analysis center, such as at a shop front, the input part 203 may acquire the second ingredient analysis result from a device, etc. which outputs the result of the ingredient analysis, through the network 150.

The read part 204 included in the food product trace apparatus 200 reads the first ingredient analysis result corresponding to the production location of the food product verified by the verification code inputted by the input part 203, from the storage part 202 (Step S303). The comparison part 206 compares the first ingredient analysis result read by the read part 204 with the second ingredient analysis result inputted by the input part 203, by using the CPU 201 (Step S304). The output part 205 outputs a comparison result of the comparison part 206 and information (shipment location information and shipment time information) indicating the production location and the shipment date and time of the food product verified by the verification code inputted by the input part 203 (Step S305). The information outputted by the output part 205 is acquired by the terminal apparatus 400*a* of the purchaser 401 through the network 150 for example, and is outputted. Thereby, the purchaser 401 can check the production location and the shipment date and time of the food product, and check whether the food product was produced truly in the production location or not, and can purchase the food product at ease.

As mentioned above, the food product trace apparatus according to the present Embodiment includes:

a storage part to store a first ingredient analysis result of analyzing an ingredient of a food product;

an input part to input verification information verifying a shipment location of the food product, generated by a verification server apparatus which generates the verification information, and a second ingredient analysis result of analyzing the ingredient of the food product after shipment of the food product;

a read part to read the first ingredient analysis result of the food product shipped at the shipment location verified by the verification information inputted by the input part, from the storage part;

a comparison part to compare, by using a processing device, the first ingredient analysis result read by the read part with the second ingredient analysis result inputted by the input part; and an output part to output a comparison result of the comparison part and shipment location information indicating the shipment location verified by the verification information inputted by the input part.

The above feature makes it possible to easily check whether information about a shipment location of a food product is correct or not.

The first ingredient analysis result is a result of analyzing the ingredient of the food product for each shipment location of the food product, and the read part reads the first ingredient analysis result corresponding to the shipment location verified by the verification information inputted by the input art, from the storage part.

The above feature makes it possible to check, after shipment, whether information about a shipment location of a food product is correct or not, even if an ingredient analysis is not individually performed with respect to each food product to be shipped.

The verification information is information verifying a shipment location and a shipment time of the food product, and the output part outputs the comparison result of the comparison part and information indicating the shipment location and the shipment time verified by the verification information inputted by the input part.

The above feature makes it possible to easily check whether information about a shipment location and a shipment time of a food product is correct or not.

Either one of the food product and packing of the food product has an attached label displaying a bar code by which the verification information is encoded, and the input part inputs the verification information upon reading the verification information from the bar code by using a bar code reader.

The above feature makes it possible to save time and effort of inputting by hand.

Moreover, the food product trace system according to the present Embodiment includes:

a verification server apparatus to generate verification information verifying a shipment location of a food product; and a food product trace apparatus including a storage part to store a first ingredient analysis result of analyzing an ingredient of the food product, an input part to input the verification information generated by the verification server apparatus, and a second ingredient analysis result of analyzing the ingredient of the food product after shipment of the food product, a read part to read the first ingredient analysis result of the food product shipped at the shipment location verified by the verification information inputted by the input part, from the storage part, a comparison part to compare, by using a processing device, the first ingredient analysis result read by the read part with the second ingredient analysis result inputted by the input part, and an output part to output a comparison result of the comparison part and shipment location information indicating the shipment location verified by the verification information inputted by the input part.

The above feature makes it possible to easily check whether information about a shipment location of a food product is correct or not.

The first ingredient analysis result is a result of analyzing the ingredient of the food product for each shipment location of the food product, and the read part included in the food product trace apparatus reads the first ingredient analysis result corresponding to the shipment location verified by the verification information inputted by the input part, from the storage part.

The above feature makes it possible to check, after shipment, whether information about a shipment location of a food product is correct or not, even if an ingredient analysis is not individually performed with respect to each food product to be shipped.

The verification information is information verifying a shipment location and a shipment time of the food product, and the output part included in the food product trace apparatus outputs the comparison result of the comparison part and information indicating the shipment location and the shipment time verified by the verification information inputted by the input part.

The above feature makes it possible to easily check whether information about a shipment location and a shipment time of a food product is correct or not.

Either one of the food product and packing of the food product has an attached label displaying a bar code by which the verification information is encoded, and the input part included in the food product trace apparatus inputs the verification information upon reading the verification information from the bar code by using a bar code reader.

The above feature makes it possible to save time and effort of inputting by hand.

The verification server apparatus generates the verification information by synthesizing information indicating a position and a time and unique data obtained only at either one of the position and the time.

The above feature improves probative value of verification information.

Moreover, the food product trace method according to the present Embodiment includes:

generating verification information verifying a shipment location of a food product, by a verification server apparatus;

storing a first ingredient analysis result of analyzing an ingredient of the food product, by a storage part included in a food product trace apparatus; inputting the verification information generated by the verification server apparatus, and a second ingredient analysis result of analyzing the ingredient of the food product after shipment of the food product, by an input part included in the food product trace apparatus;

reading the first ingredient analysis result of the food product shipped at the shipment location verified by the verification information inputted by the input part, from the storage part, by a read part included in the food product trace apparatus;

comparing, by using a processing device, the first ingredient analysis result read by the read part with the second ingredient analysis result inputted by the input part, by a comparison part included in the food product trace apparatus; and outputting a comparison result of the comparison part and shipment location information indicating the shipment location verified by the verification information inputted by the input part, by an output part included in the food product trace apparatus.

The above feature makes it possible to easily check whether information bout a shipment location of a food product is correct or not.

The first ingredient analysis result is a result of analyzing the ingredient of the food product for each shipment location of the food product, and the food product trace method includes reading the first ingredient analysis result corresponding to the shipment location verified by the verification information inputted by the input part, from the storage part, by the read part included in the food product trace apparatus.

The above feature makes it possible to check, after shipment, whether information about a shipment location of a food product is correct or not, even if an ingredient analysis is not individually performed with respect to each food product to be shipped.

Embodiment 4

As an ingredient analysis method of a food product, a method by which a production location and a freshness degree (for example, it can be represented by elapsed days since the production) of a food product can be judged based on an ingredient analysis result of the food product (for example, by the natural water analysis mentioned above) is used in the present Embodiment.

The configuration of the food product trace system according to the present Embodiment is the same as that of Embodiment 2 described referring to FIG. 5.

FIG. 8 is a flowchart showing an operation of the food product trace apparatus (an example of the food product trace method) according to the present Embodiment.

First, if necessary, the producer 402 registers an ingredient analysis result (first ingredient analysis result) of a food product in the database etc. of the ingredient analysis center. In the present Embodiment, it is not necessary to perform an ingredient analysis each time at the shipment of the food product. For example, if an ingredient analysis of a food product to be actually shipped is performed and the production location and the freshness degree judged from the result of the ingredient analysis will become the same as (or close to) the production location and the freshness degree judged from the ingredient analysis result registered in the database etc. of the ingredient analysis center in the past, then the ingredient analysis result registered in the past can be used as substitution.

The terminal apparatus 400*b* of the producer 402 acquires the verification code verifying the production location and the shipment date and time of the food product from the verification server apparatus 300 at the shipment of the food product, by the method mentioned above.

The storage part 202 included in the food product trace apparatus 200 stores the first ingredient analysis result (Step S301). As to the first ingredient analysis result, it may be inputted by the input part 203, or the storage part 202 may acquire it from the database etc. of the ingredient analysis center through the network 150. The storage part 202 may previously store information indicating correspondence between a plurality of production locations, freshness degrees and ingredient analysis results.

Next, the producer 402 attaches a label displaying the verification code to the food product, and ships the food product. The food product will be put in a shop front through a distribution process.

The input part 203 included in the food product trace apparatus 200 inputs the verification code generated by verification server apparatus 300 and a second ingredient analysis result of analyzing the ingredient of the food product after shipment of the food product (for example, when it is put in a shop front) (Step 402). As to the verification code, the input part 203 acquires it from the purchaser 401 (or its terminal apparatus 400a) by communication etc. When a bar code by which the verification code is encoded is displayed on the label of the food product, the input part 203 may read the verification code from the bar code by using a bar code reader, or the input part 203 may acquire the verification code read from the bar code by using a bar code reader (for example, a bar code reader installed in the terminal apparatus 400a of the purchaser 401), from the terminal apparatus 400a through the network 150.

Moreover, as to the second ingredient analysis result, the input part 203 acquires it from the ingredient analysis center (for example, database etc. of the ingredient analysis center) by communication etc. (In this case, the purchaser 401 sends the food product or a part of the food product to the ingredient analysis center and requests an ingredient analysis of the food product. The ingredient analysis center performs the ingredient analysis of the food product in response to this request, and obtains the second ingredient analysis result.) In the case the ingredient analysis is performed at other than the ingredient analysis center, such as at a shop front, the input part 203 may acquire the second ingredient analysis result from a device, etc. which outputs the result of the ingredient analysis, through the network 150.

The read part 204 included in the food product trace apparatus 200 judges a freshness degree of the food product by comparing the current time and the shipment date and time of the food product verified by the verification code inputted by the input part 203, and reads the first ingredient analysis result corresponding to the production location of the food product verified by the verification code inputted by the input part 203 and the judged freshness degree, from the storage part 202 (Step S403). The comparison part 206 compares the first ingredient analysis result read by the read part 204 with the second ingredient analysis result inputted by the input part 203, by using the CPU 201 (Step S404). The output part 205 outputs a comparison result of the comparison part 206 and information (shipment location information and shipment time information) indicating the production location and the shipment date and time of the food product verified by the verification code inputted by the input part 203 (Step S405). The information outputted by the output part 205 is acquired by the terminal apparatus 400a of the purchaser 401 through the network 150 for example, and is outputted. Thereby, the purchaser 401 can check the production location and the shipment date and time of the food product, and check whether the food product was truly produced in the production location and truly shipped at the date and time (usually, specifying time is not required because it is enough to be able to check a day, week, or month of shipping or producing of the food product.), and can purchase the food product at ease.

As mentioned above, the food product trace apparatus according to the present Embodiment includes the same features as the food product trace apparatus according to Embodiment 2, and the first ingredient analysis result is a result of analyzing the ingredient of the food product for each shipment location and freshness degree of the food product, and the read part judges a freshness degree of the food product based on the shipment time verified by the verification information inputted by the input part, and reads the first ingredient analysis result corresponding to the shipment location verified by the verification information inputted by the input part and the freshness degree judged, from the storage part.

Moreover, the food product trace system according to the present Embodiment includes the same features as the food product trace system according to Embodiment 2, and the first ingredient analysis result is a result of analyzing the ingredient of the food product for each shipment location and freshness degree of the food product, and the read part included in the food product trace apparatus judges a freshness degree of the food product based on the shipment time verified by the verification information inputted by the input part, and reads the first ingredient analysis result corresponding to the shipment location verified by the verification information inputted by the input part and the freshness degree judged, from the storage part.

The above feature makes it possible to check, after shipment, whether information about a shipment location and a shipment time of a food product is correct or not, even if an ingredient analysis is not individually performed with respect to each food product to be shipped.

Embodiment 5

FIG. 9 is a block diagram showing a configuration of a food product trace system according to the present Embodiment.

The food product trace system 100 includes a terminal apparatus 400c used by a distributor 403 (an example of a shipment sender) and a terminal apparatus 400d used by a retailer 404 (an example of a shipment sender). The food product trace apparatus 200 includes a link setting part 207. Other configuration is the same as that of Embodiment 2 described referring to FIG. 5.

FIG. 10 is a flowchart showing an operation of the food product trace apparatus (an example of a food product trace method) according to the present Embodiment.

First, the producer 402 registers an ingredient analysis result (first ingredient analysis result) of a food product in the database etc. of the ingredient analysis center. The terminal apparatus 400b of the producer 402 acquires a verification code verifying the production location and the shipment date and time of the food product, from the verification server apparatus 300, at the shipment of the food product, by the method mentioned above.

The storage part 202 included in the food product trace apparatus 200 stores the first ingredient analysis result of analyzing the ingredient of the food product at the shipment of the food product, upon making the first ingredient analysis result corresponding to the verification code verifying the production location and the shipment time of the food product, generated by the verification server apparatus 300 (Step S501). As to the verification code, it may be inputted by the input part 203, or the storage part 202 may acquire it from the verification server apparatus 300 or the terminal apparatus 400b through the network 150. Moreover, as to the first ingredient analysis result, it may be inputted by the input part 203, or the storage part 202 may acquire it from a database etc. of the ingredient analysis center through the network 150.

Next, the producer 402 attaches a label displaying the verification code to the food product, and ships the food product. In the distribution process of a food product, the distributor 403 registers an ingredient analysis result (first ingredient analysis result) of the food product in the database etc. of the ingredient analysis center at the shipment of the food product, by the same method as the producer 402. At the same time, the terminal apparatus 400c of the distributor 403 acquires the verification code verifying the transit location (location where the distributor 403 ships the food product) and the shipment date and time (an example of a transit time) of the food product, from the verification server apparatus 300, by the same method as the producer 402. The same is performed in relation to the retailer 404.

The storage part 202 included in the food product trace apparatus 200 stores the first ingredient analysis result of analyzing the ingredient of the food product at the transit, upon making the first ingredient analysis result corresponding to the verification code verifying the transit location and the shipment date and time in the distribution process of the food product, generated by the verification server apparatus 300 (Step S502). As to the verification code, it may be inputted by the input part 203, or the storage part 202 may acquire it from the verification server apparatus 300 or the terminal apparatus 400c and the terminal apparatus 400d, through the network 150. Moreover, as to the first ingredient analysis result, it may be inputted by the input part 203, or the storage part 202 may acquire it from the database etc. of the ingredient analysis center through the network 150.

The link setting part 207 included in the food product trace apparatus 200 sets a link between verification codes adjoining in accordance with an order of the time verified by the verification codes stored in the storage part 202 (Step S503). In this example, the verification code issued to the producer 402 and the verification code issued to the distributor 403 are in an adjoining relation, and the verification code issued to the distributor 403 and the verification code issued to the retailer 404 are in an adjoining relation. Therefore, a link is set between the verification code issued to the producer 402 and the verification code issued to the distributor 403, and a link is set between the verification code issued to the distributor 403 and the verification code issued to the retailer 404.

Next, the food product through a distribution process will be put in a shop front.

The input part 203 included in the food product trace apparatus 200 inputs the verification code generated by the verification server apparatus 300 (Step S504). As to the verification code, it may be any of the verification codes issued to the producer 402, the distributor 403, and the retailer 404, and the input part 203 acquires it from the purchaser 401 (or its terminal apparatus 400a) by communication etc. In the case a bar code by which the verification code is encoded is displayed on the label of the food product, the input part 203 may read the verification code from the bar code by using a bar code reader, or the input part 203 may acquire the verification code read from the bar code by using a bar code reader (for example, a bar code reader installed in the terminal apparatus 400a of the purchaser 401), from the terminal apparatus 400a through the network 150.

The read part 204 included in the food product trace apparatus 200 reads the first ingredient analysis result corresponding to the verification code inputted by the input part 203, and a first ingredient analysis result corresponding to a verification code to which a link with the verification code inputted by the input part is set by the link setting part 207, from the storage part 202 (Step S505). The comparison part 206 compares the two first ingredient analysis results read by the read part 204, by using the CPU 201 (Step S506). The output part 205 outputs a comparison result of the comparison part 206, the shipment location information indicating the shipment location verified by the verification code inputted by the input part 203, and the shipment location information indicating the shipment location verified by the verification code to which the link with the verification code inputted by the input part 202 is set by the link setting part 207 (Step S507). The information outputted by the output part 205 is acquired by the terminal apparatus 400a of the purchaser 401 through the network 150 for example, and is outputted. Thereby, the purchaser 401 can check the shipment location, and the shipment date and time of the food product, and check whether the food product is not secretly substituted for another food product in the distribution process or not, and can purchase the food product at ease.

In the above example, though the comparison part 206 compares the two first ingredient analysis results in Step S506, it may compare three or more first ingredient analysis results.

As mentioned above, the food product trace apparatus according to the present Embodiment includes:

a storage part to store a first ingredient analysis result of analyzing an ingredient of a food product;

an input part to input verification information verifying a shipment location of the food product, generated by a verification server apparatus which generates the verification information, and a second ingredient analysis result of analyzing the ingredient of the food product after shipment of the food product;

a read part to read the first ingredient analysis result of the food product shipped at the shipment location verified by the verification information inputted by the input part, from the storage part;

a comparison part to compare, by using a processing device, the first ingredient analysis result read by the read part with the second ingredient analysis result inputted by the input part; and an output part to output a comparison result of the comparison part and shipment location information indicating the shipment location verified by the verification information inputted by the input part.

The above feature makes it possible to easily check whether information about a shipment location of a food product is correct or not.

The shipment location includes a production location of the food product and a transit location in a distribution process of the food product, the shipment time includes a shipment time at the production location and a transit time at the transit location, the verification information is information verifying a position and a time, the storage part stores the first ingredient analysis result of analyzing the ingredient of the food product at shipment of the food product upon making the first ingredient analysis result corresponding to the verification information verifying the production location and the shipment time of the food product, generated by the verification server apparatus, and stores the first ingredient analysis result of analyzing the ingredient of the food product at transit upon making the first ingredient analysis result corresponding to the verification information verifying the transit location and the transit time in the distribution process of the food product, generated by the verification server apparatus, and the read part reads the first ingredient analysis result corresponding to the verification information inputted by the input part, from the storage part.

The above feature makes it possible to check whether information about each shipment location and shipment time is correct or not, based on verification information acquired at each of a plurality of locations in a distribution process of a food product.

The food product trace apparatus further includes:

a link setting part to set a link between verification information adjoining in accordance with an order of the time verified by the verification information stored in the storage part, wherein the read part reads the first ingredient analysis result corresponding to the verification information inputted by the input part, and a first ingredient analysis result corresponding to verification information to which a link with the verification information inputted by the input part is set by the link setting part, from the storage part, the comparison part compares, by using the processing device, two first ingredient analysis results read by the read part, and the output part outputs the comparison result of the comparison part, the shipment location information indicating the shipment location verified by the verification information inputted by the input part, and shipment location information indicating a shipment location verified by the verification information to which the link with the verification information inputted by the input part is set by the link setting part.

The above feature makes it possible to check whether information about a shipment location and a shipment time at each of a plurality of locations in a distribution process of a food product is correct or not, based on verification information acquired at one location in the distribution process of the food product.

Either one of the food product and packing of the food product has an attached label displaying a bar code by which the verification information is encoded, and the input part inputs the verification information upon reading the verification information from the bar code by using a bar code reader.

The above feature makes it possible to save time and effort of inputting by hand.

Moreover, the food product trace system according to the present Embodiment includes:

a verification server apparatus to generate verification information verifying a shipment location of a food product; and a food product trace apparatus including a storage part to store a first ingredient analysis result of analyzing an ingredient of the food product, an input part to input the verification information generated by the verification server apparatus, and a second ingredient analysis result of analyzing the ingredient of the food product after shipment of the food product, a read part to read the first ingredient analysis result of the food product shipped at the shipment location verified by the verification information inputted by the input part, from the storage part, a comparison part to compare, by using a processing device, the first ingredient analysis result read by the read part with the second ingredient analysis result inputted by the input part, and an output part to output a comparison result of the comparison part and shipment location information indicating the shipment location verified by the verification information inputted by the input part.

The above feature makes it possible to easily check whether information about a shipment location of a food product is correct or not.

The shipment location includes a production location of the food product and a transit location in a distribution process of the food product, the shipment time includes a shipment time at the production location, and a transit time at the transit location, the verification information is information verifying a position and a time, the storage part included in the food product trace apparatus stores the first ingredient analysis result of analyzing the ingredient of the food product at shipment of the food product upon making the first ingredient analysis result corresponding to the verification information verifying the production location and the shipment time of the food product, generated by the verification server apparatus, and stores the first ingredient analysis result of analyzing the ingredient of the food product at transit upon making the first ingredient analysis result corresponding to the verification information verifying the transit location and the transit time in the distribution process of the food product, generated by the verification server apparatus, and the read part included in the food product trace apparatus reads the first ingredient analysis result corresponding to the verification information inputted by the input part, from the storage part.

The above feature makes it possible to check whether information about each shipment location and shipment time is correct or not, based on verification information acquired at each of a plurality of locations in a distribution process of a food product.

The food product trace apparatus further includes a link setting part to set a link between verification information adjoining in accordance with an order of the time verified by the verification information stored in the storage part, the read part included in the food product trace apparatus reads the first ingredient analysis result corresponding to the verification information inputted by the input part, and a first ingredient analysis result corresponding to verification information to which a link with the verification information inputted by the input part is set by the link setting part, from the storage part, the comparison part included in the food product trace apparatus compares, by using the processing device, two first ingredient analysis results read by the read part, and the output part included in the food product trace apparatus outputs the comparison result of the comparison part, the shipment location information indicating the shipment location verified by the verification information inputted by the input part, and shipment location information indicating a shipment location verified by the verification information to which the link with the verification information inputted by the input part is set by the link setting part.

The above feature makes it possible to check whether information about a shipment location and a shipment time at each of a plurality of locations in a distribution process of a food product is correct or not, based on verification information acquired at one location in the distribution process of the food product.

Either one of the food product and packing of the food product has an attached label displaying a bar code by which the verification information is encoded, and the input part included in the food product trace apparatus inputs the verification information upon reading the verification information from the bar code by using a bar code reader.

The above feature makes it possible to save time and effort of inputting by hand.

The verification server apparatus generates the verification information by synthesizing information indicating a position and a time and unique data obtained only at either one of the position and the time.

The above feature improves probative value of verification information.

Moreover, the food product trace method according to the present Embodiment includes:

generating verification information verifying a shipment location of a food product, by a verification server apparatus;

storing a first ingredient analysis result of analyzing an ingredient of the food product, by a storage part included in a food product trace apparatus;

inputting the verification information generated by the verification server apparatus, and a second ingredient analysis result of analyzing the ingredient of the food product after shipment of the food product, by an input part included in the food product trace apparatus;

reading the first ingredient analysis result of the food product shipped at the shipment location verified by the verification information inputted by the input part, from the storage part, by a read part included in the food product trace apparatus;

comparing, by using a processing device, the first ingredient analysis result read by the read part with the second ingredient analysis result inputted by the input part, by a comparison part included in the food product trace apparatus; and outputting a comparison result of the comparison part and shipment location information indicating the shipment location verified by the verification information inputted by the input part, by an output part included in the food product trace apparatus.

The above feature makes it possible to easily check whether information about a shipment location of a food product is correct or not.

FIG. 11 shows an example of appearance of each apparatus configuring the food product trace system according to the above-mentioned Embodiments.

In FIG. 11, the food product trace apparatus 200, the verification server apparatus 300, and the terminal apparatuses 400a-d are provided with a system unit 910, a CRT (Cathode Ray Tube) display 901, a keyboard (K/B) 902, a mouse 903, a compact disk drive (CDD) 905, a printer 906, and a scanner 907, and these are connected by cable. Furthermore, the food product trace apparatus 200, the verification server apparatus 300, and the terminal apparatuses 400a-d are connected to a facsimile machine 932 and a telephone 931 by cable, and connected the Internet 940 through a Local Area Network (LAN) 942 and a gateway 941. Moreover, the food product trace apparatus 200 and the terminal apparatuses 400a-d may incorporate the above-mentioned bar code reader (it may be a device having a function of reading a bar code, or it may be a combination of a software having a function of reading a bar code and a device, such as a digital camera) or they may be connected to a non-illustrated bar code reader.

FIG. 12 shows an example of a hardware configuration of each apparatus configuring the food product trace system according to the above-mentioned Embodiments.

In FIG. 12, the food product trace apparatus 200, the verification server apparatus 300, and the terminal apparatuses 400a-d are provided with a CPU 911 (equivalent to the CPU 201 shown in FIGS. 3, 5, and 9 in the food product trace apparatus 200) which executes a program. The CPU 911 is connected to a ROM 913, a RAM 914, a communication board 915, the CRT display 901, the K/B 902, the mouse 903, a FDD (Flexible Disk Drive) 904, a magnetic disk drive 920, the CDD 905, the printer 906, and the scanner 907, through a bus 912.

The RAM 914 is an example of a volatile memory. The ROM 913, the FDD 904, the CDD 905, and the magnetic disk drive 920 are examples of nonvolatile memories. These are examples of the storage devices or the storage parts.

The communication board 915 is connected to the facsimile machine 932, the telephone 931, the LAN 942, etc. The communication board 915 is an example of the input device, the input part, the output device, or the output part.

For example, the K/B 902, the scanner 907, the FDD 904, etc. are examples of the input devices or the input parts. Moreover, for example, the CRT display 901 etc. is an example of the output device or the output part.

It is also acceptable for the communication board 915 to be directly connected to the Internet 940, or a WAN (Wide Area Network), such as ISDN (Integrated Services Digital Network) instead of the LAN 942. When directly connected to the Internet 940 or the WAN, such as ISDN, the food product trace apparatus 200, the verification server apparatus 300, and the terminal apparatuses 400a-d are connected to the Internet 940 or the WAN, such as ISDN, and the gateway 941 becomes unnecessary.

An operating system (OS) 921, a window system 922, a program group 923, and a file group 924 are stored in the magnetic disk drive 920. The program group 923 is executed by the CPU 911, the OS 921, and the window system 922.

In the program group 923, a program which executes the function described as a 'so-and-so part' in the above-mentioned Embodiments is stored. The program is read and executed by the CPU 911.

For example, the CPU 911 etc. is an example of a processing device or a processing part.

In the file group 924, what is described as 'so-and-so information', and 'so-and-so result' in the above Embodiments is stored as a file or a part of it.

Moreover, the arrows in the flowcharts described in the above Embodiments mainly indicate inputting and outputting data. The data to be input and output is stored in other recording medium, such as the magnetic disk drive 920, a FD (Flexible Disk), an optical disk, a CD (compact disk), a MD (mini disk), and a DVD (Digital Versatile Disk), or transmitted by a signal line or other transmission media.

Moreover, what is described as a 'so-and-so part' in the above Embodiments may be realized by firmware stored in the ROM 913. Otherwise, it may be executed by software only, hardware only, a combination of software and hardware or a combination with firmware.

Moreover, the program which executes Embodiments mentioned above may be stored by using a recording apparatus of other recording medium, such as the magnetic disk drive 920, a FD, an optical disk, a CD, a MD, and a DVD.

BRIEF DESCRIPTION OF THE DRAWINGS

FIG. 4 is a flowchart showing an operation of a food product trace apparatus according to Embodiment 1;

Figure 1:
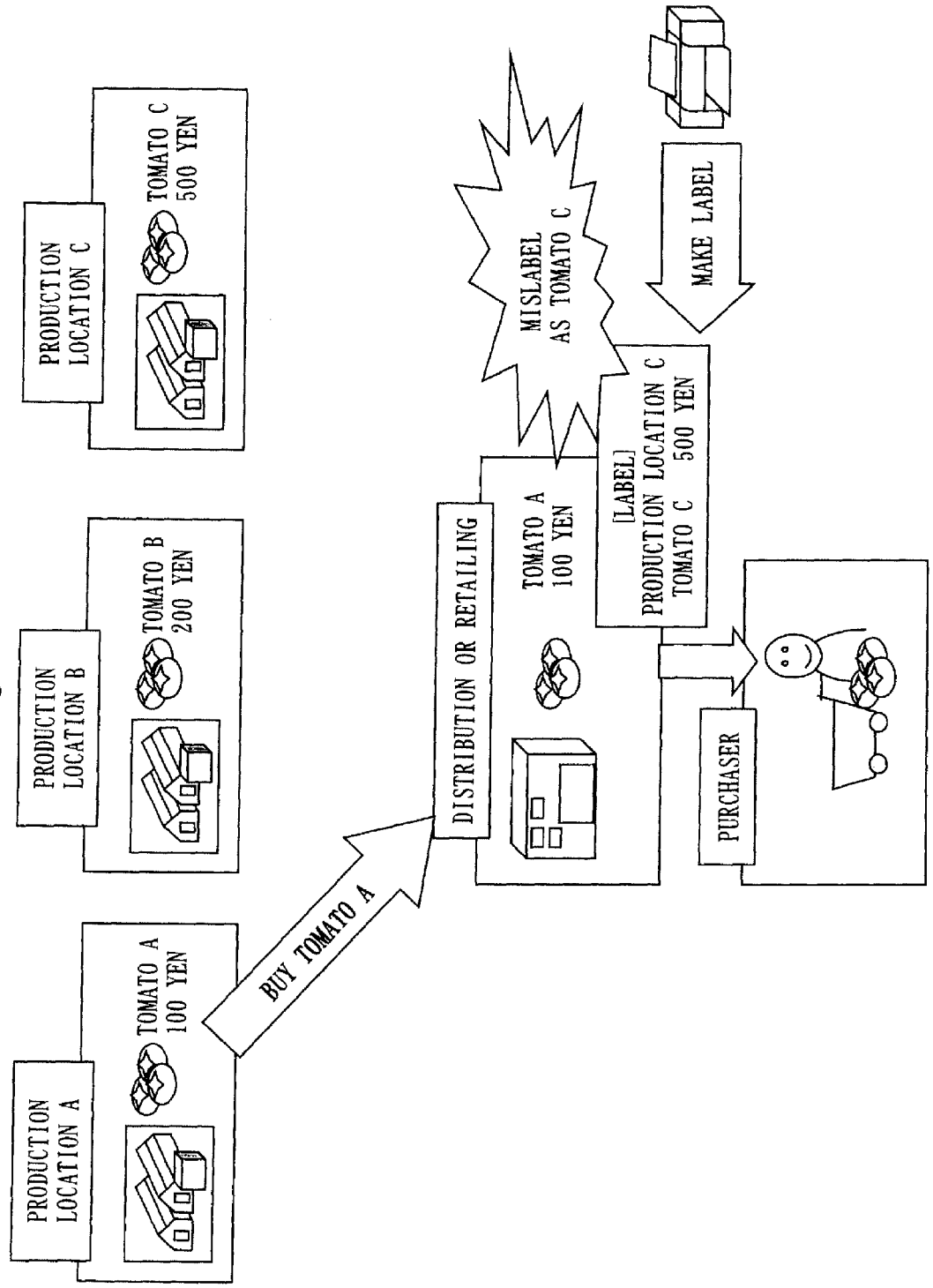
FIG. 1 shows a conceptual diagram illustrating a distribution process of a food product.
Figure 2:
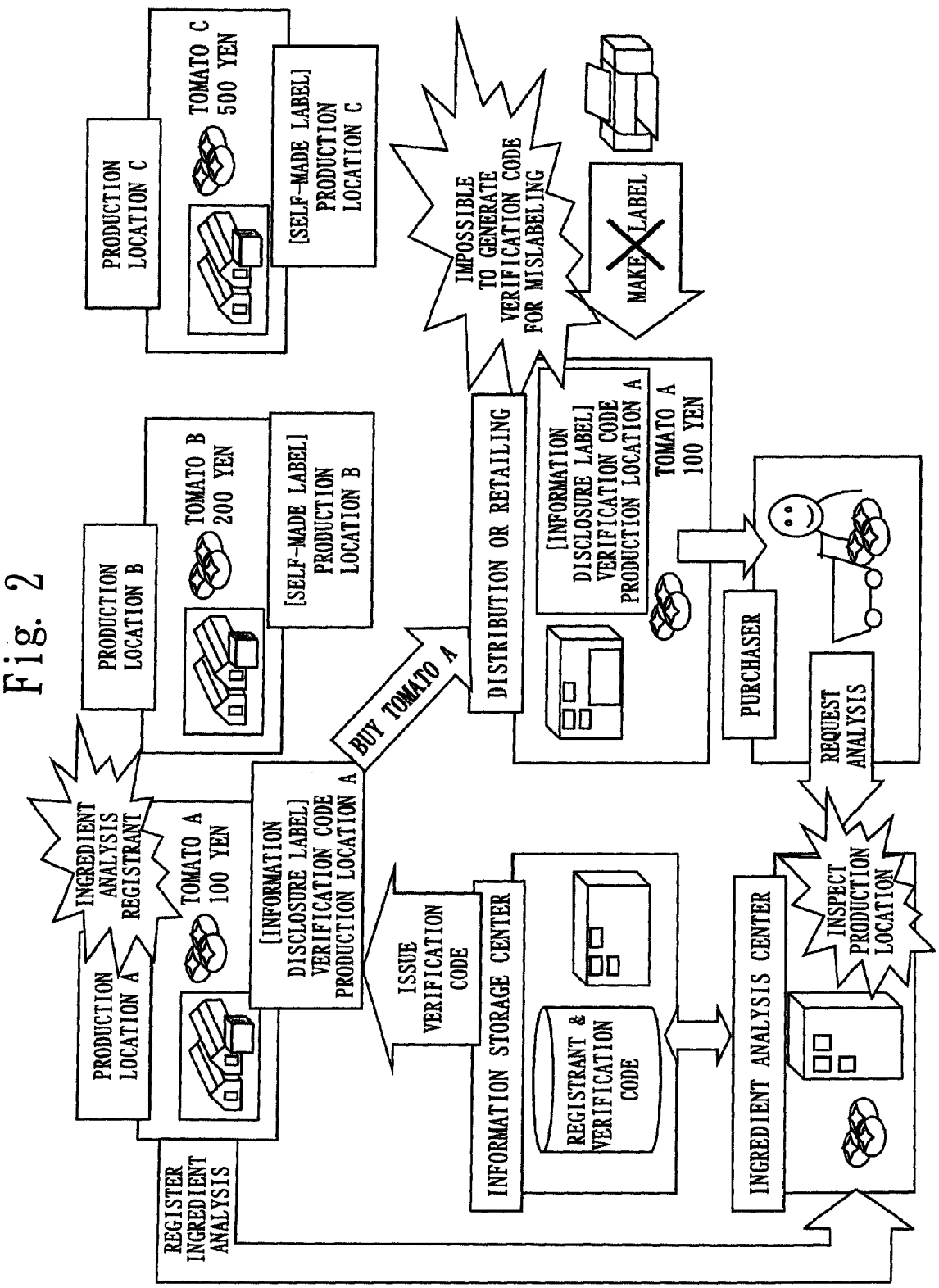
FIG. 2 shows a conceptual diagram illustrating a distribution process of a food product in each Embodiment.
Figure 3:
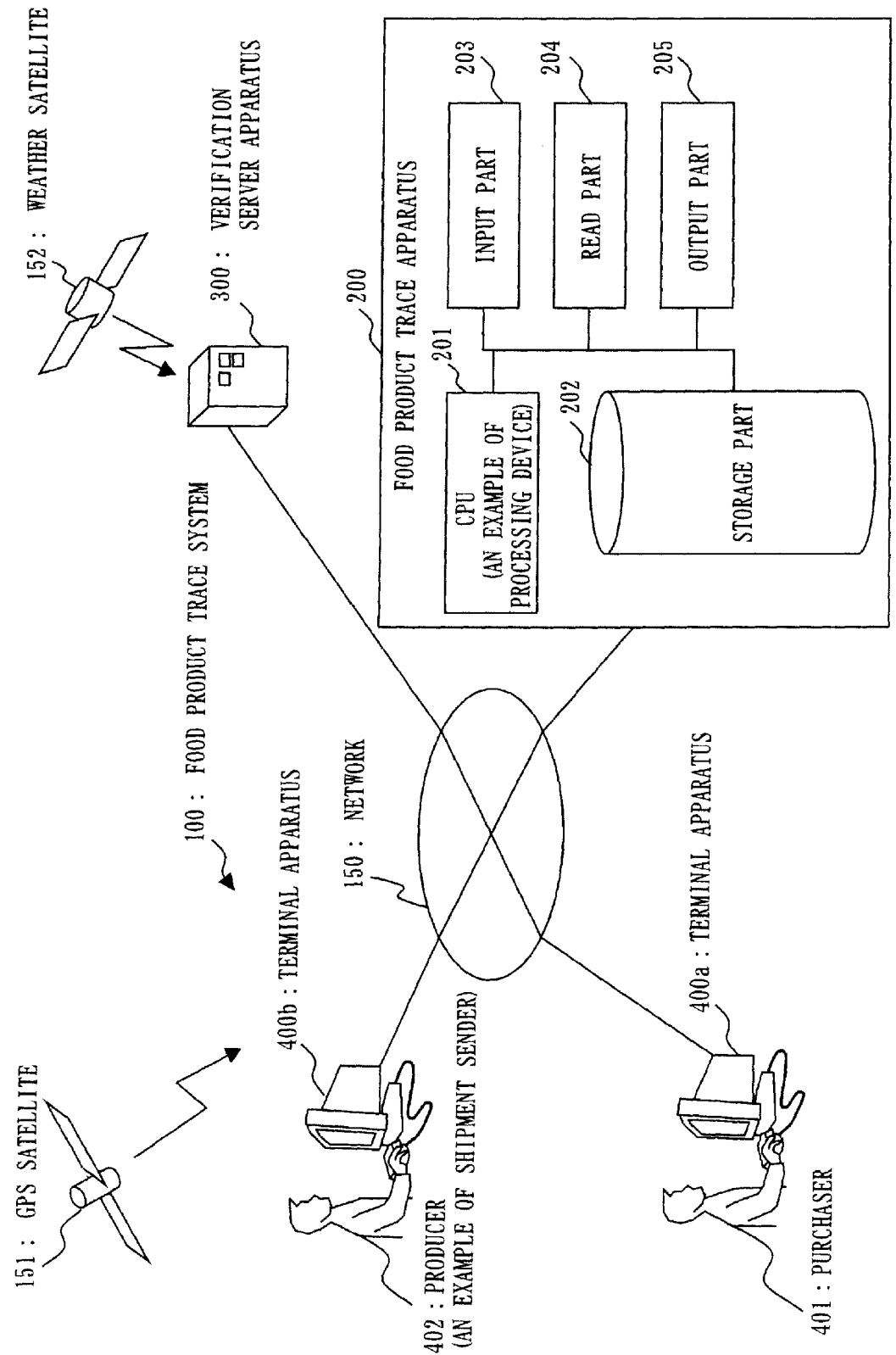
FIG. 3 is a block diagram showing a configuration of a food product trace system according to Embodiment 1.
Figure 5:
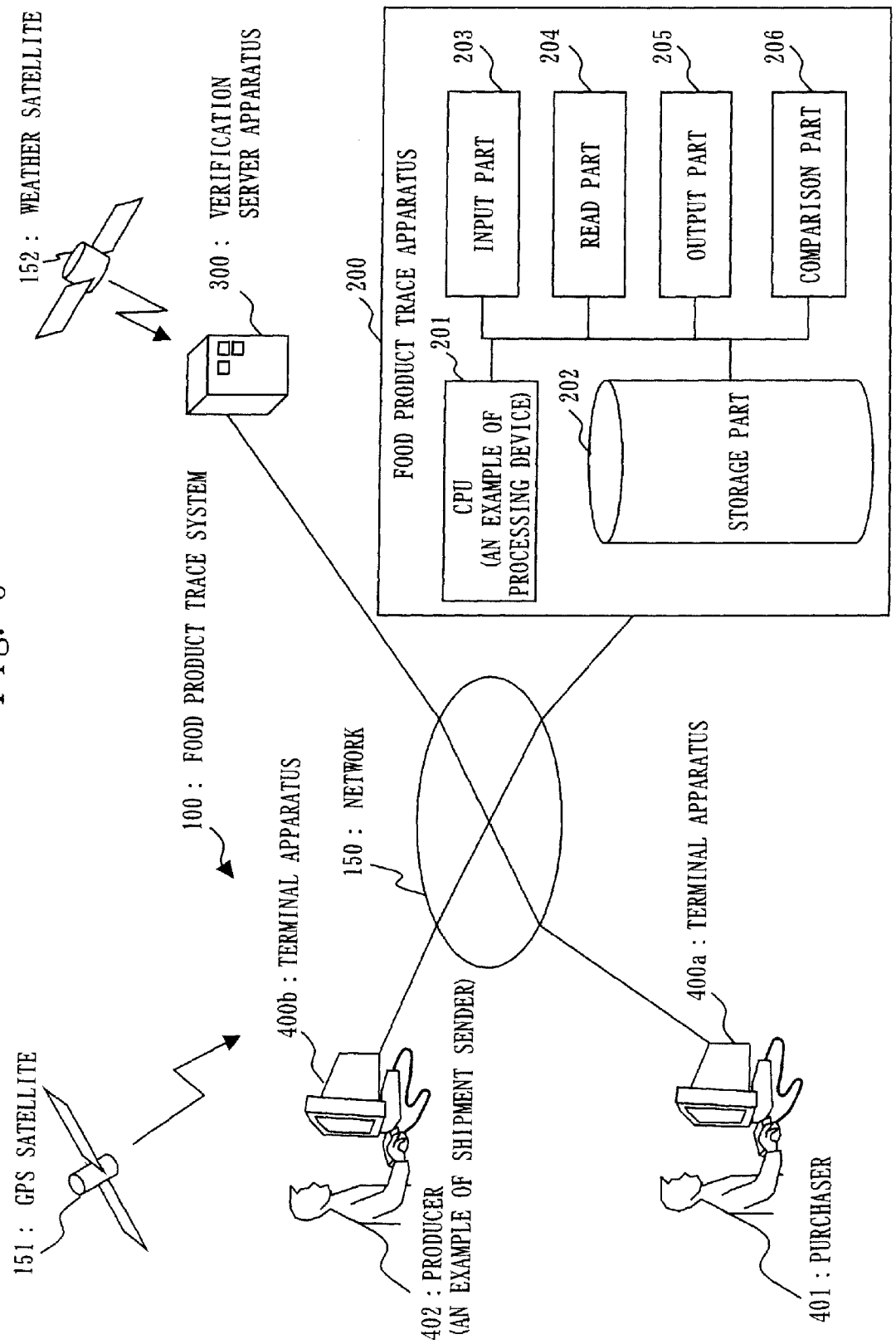
FIG. 5 is a block diagram showing a configuration of a food product trace system according to Embodiment 2.
Figure 6:
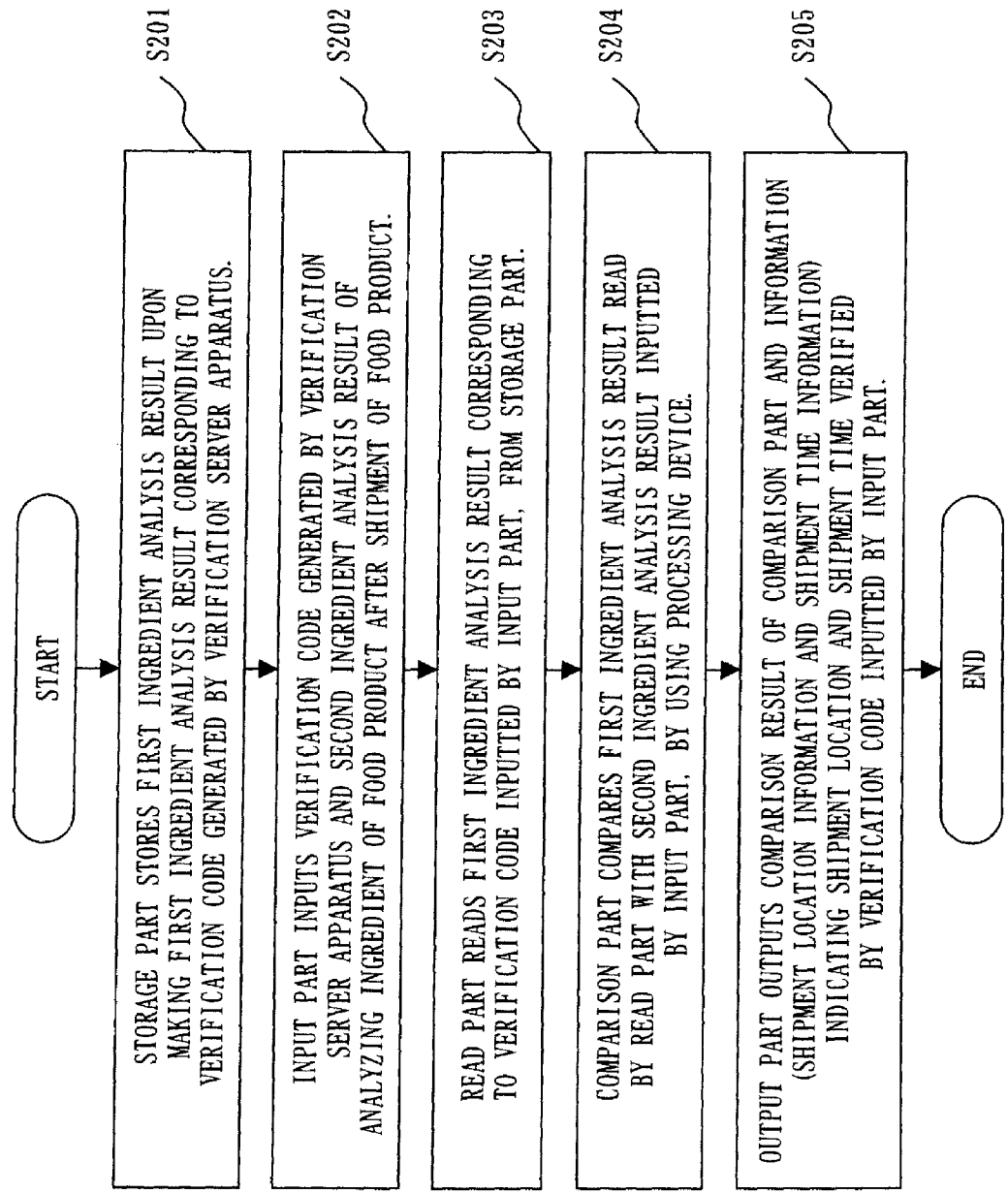
FIG. 6 is a flowchart showing an operation of the food product trace apparatus according to Embodiment 2.
Figure 7:
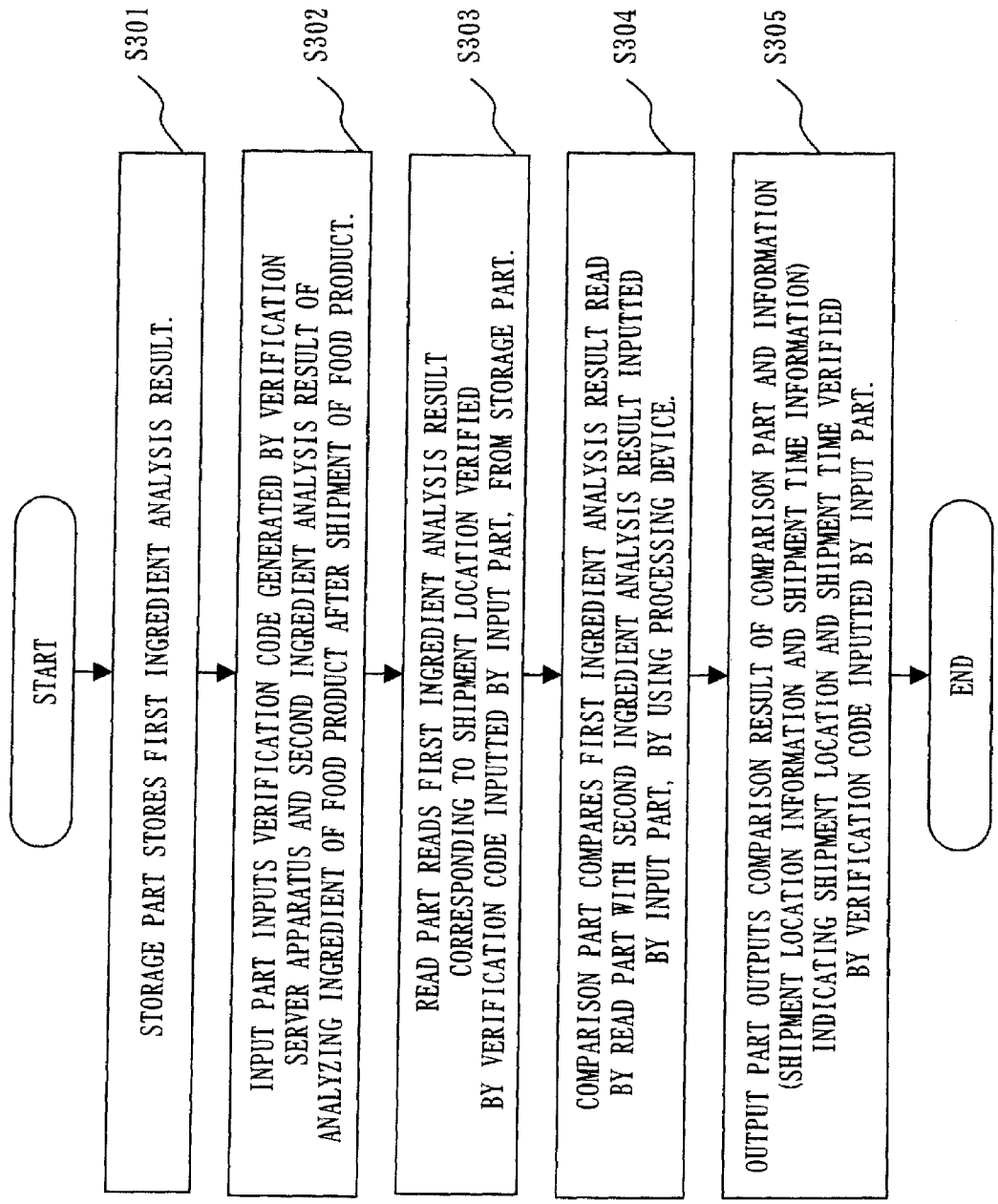
FIG. 7 is a flowchart showing an operation of a food product trace apparatus according to Embodiment 3.
Figure 8:
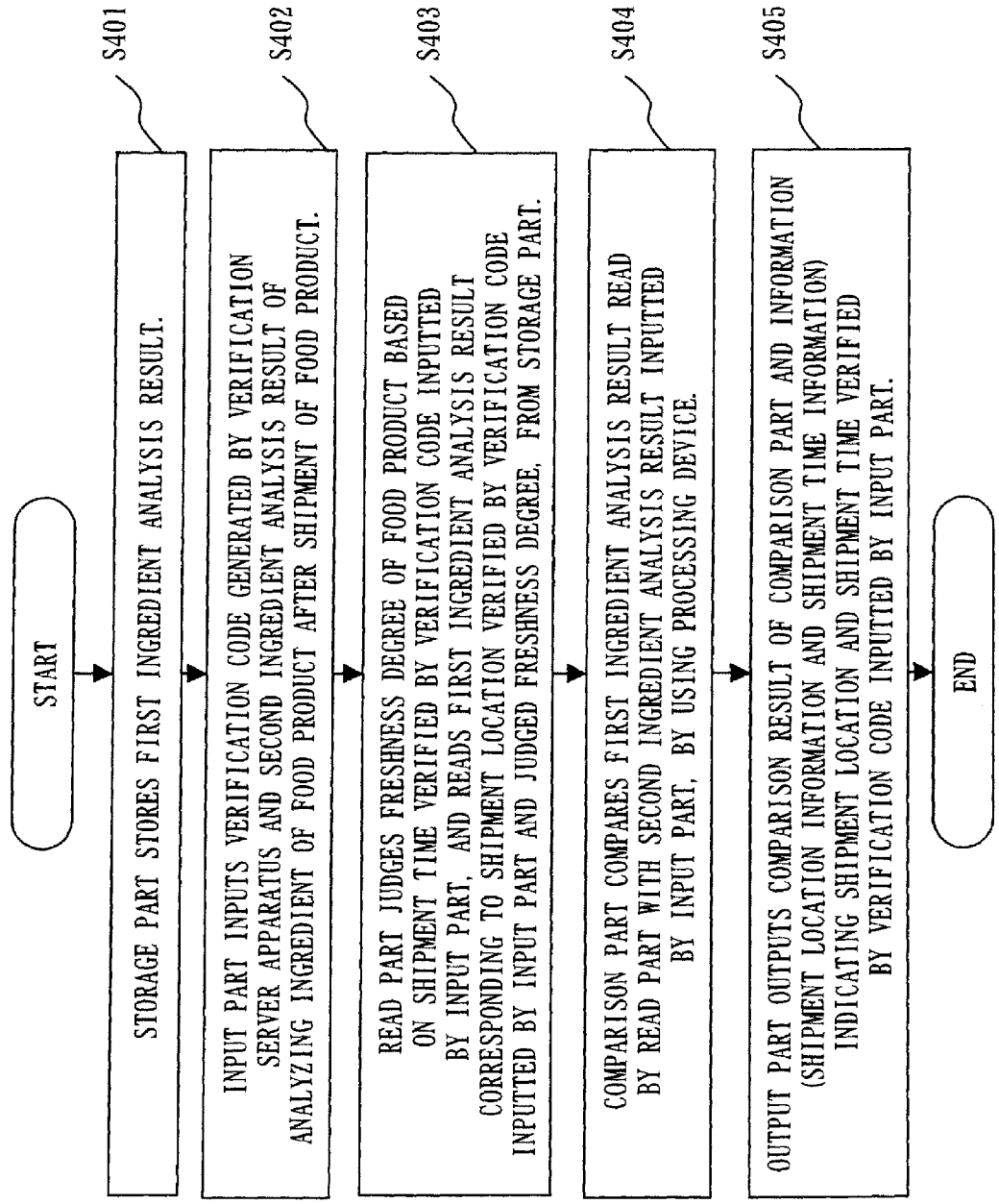
FIG. 8 is a flowchart showing an operation of a food product trace apparatus according to Embodiment 4.
Figure 9:
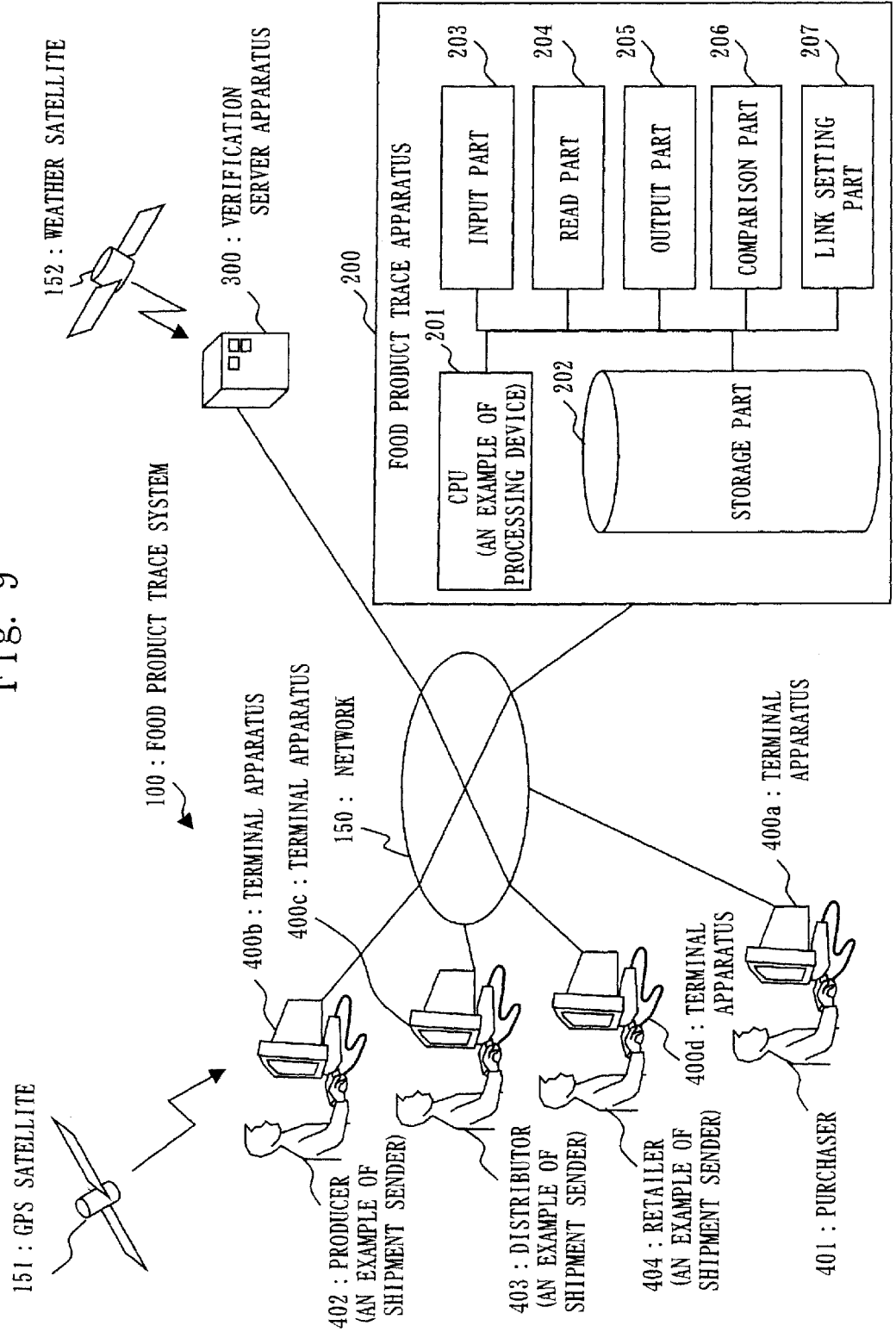
FIG. 9 is a block diagram showing a configuration of a food product trace system according to Embodiment 5.
Figure 10:
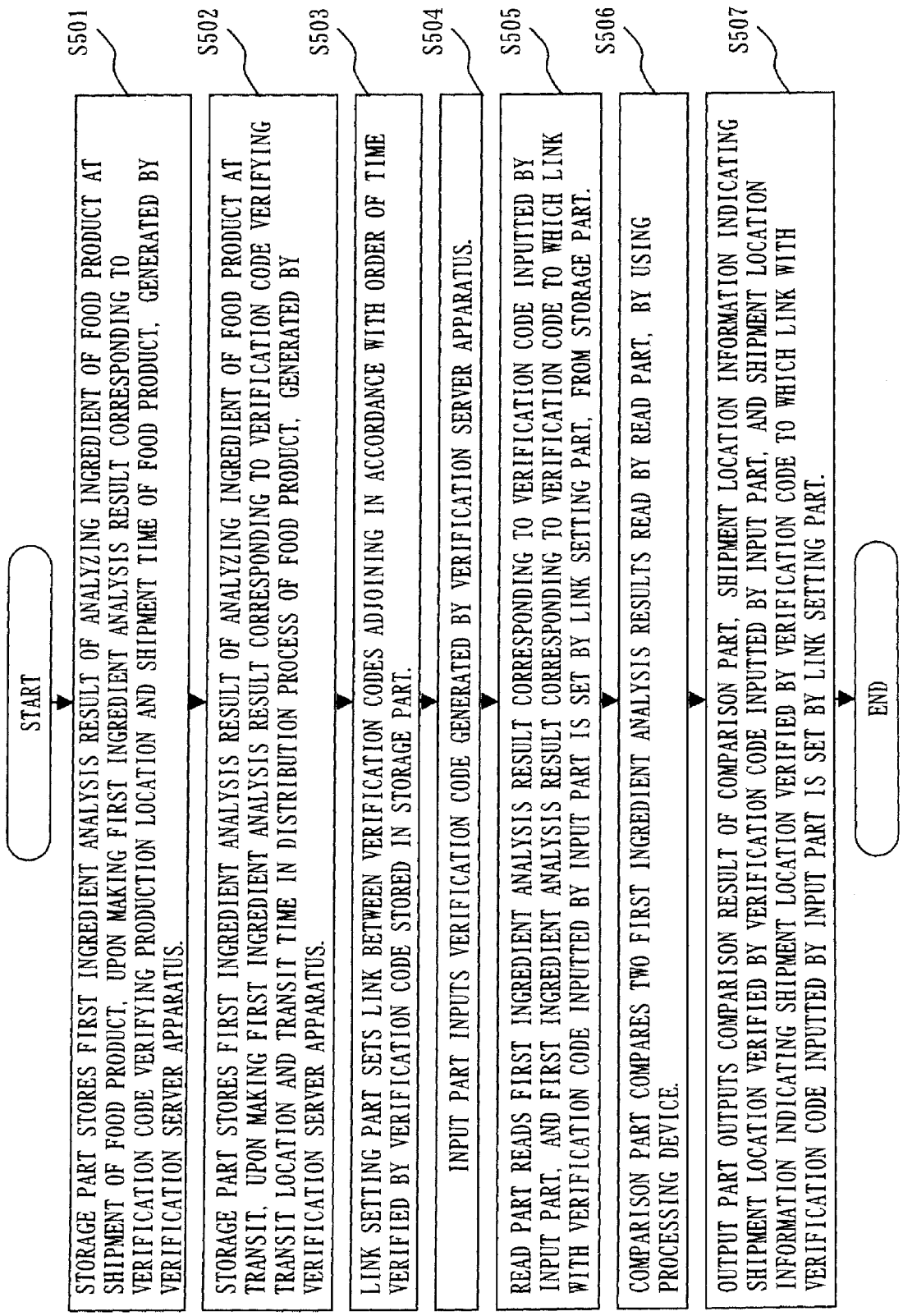
FIG. 10 is a flowchart showing an operation of a food product trace apparatus according to Embodiment 5.
Figure 11:
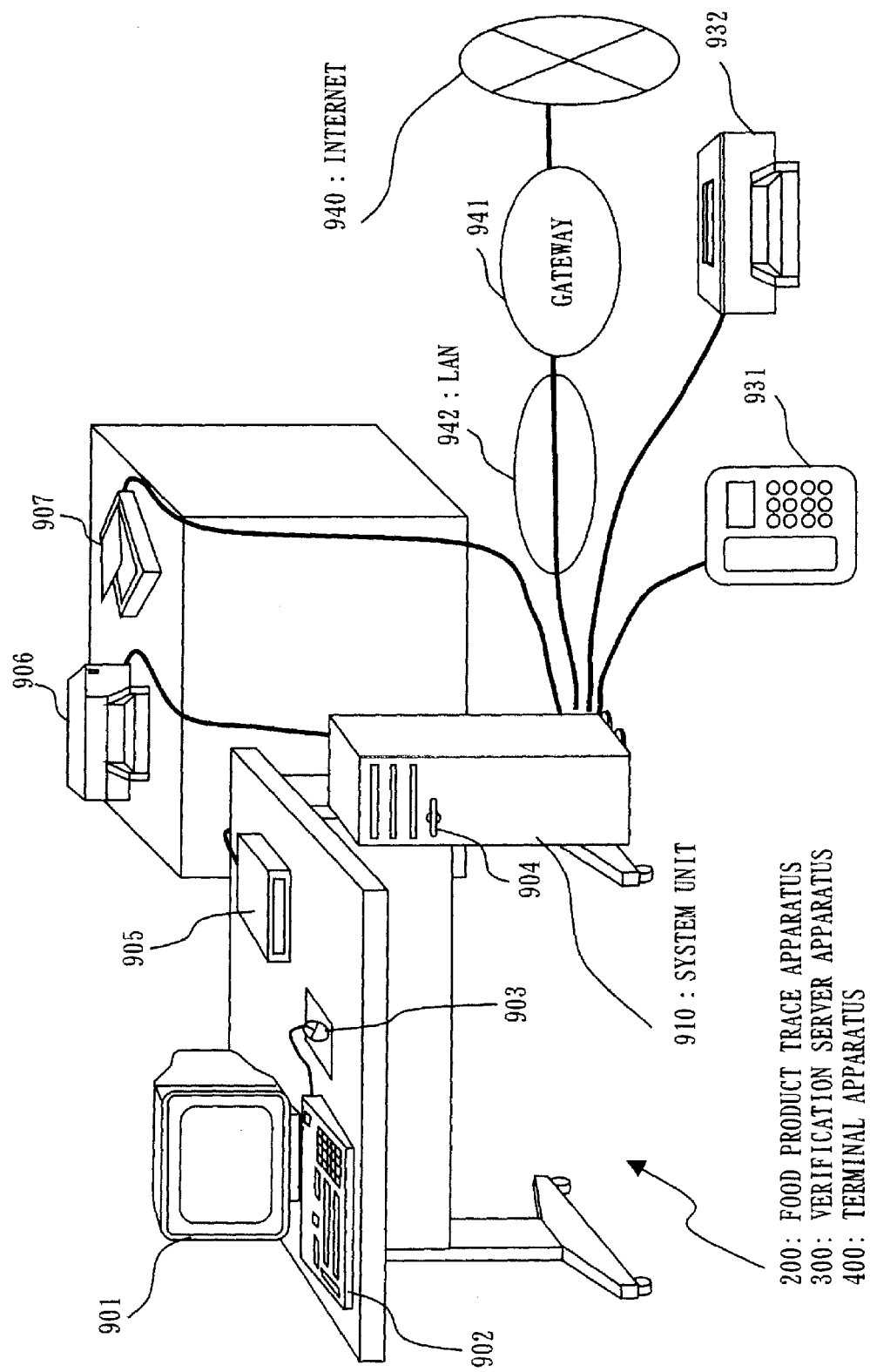
FIG. 11 shows an example of appearance of each apparatus configuring the food product trace system in each Embodiment.
Figure 12:
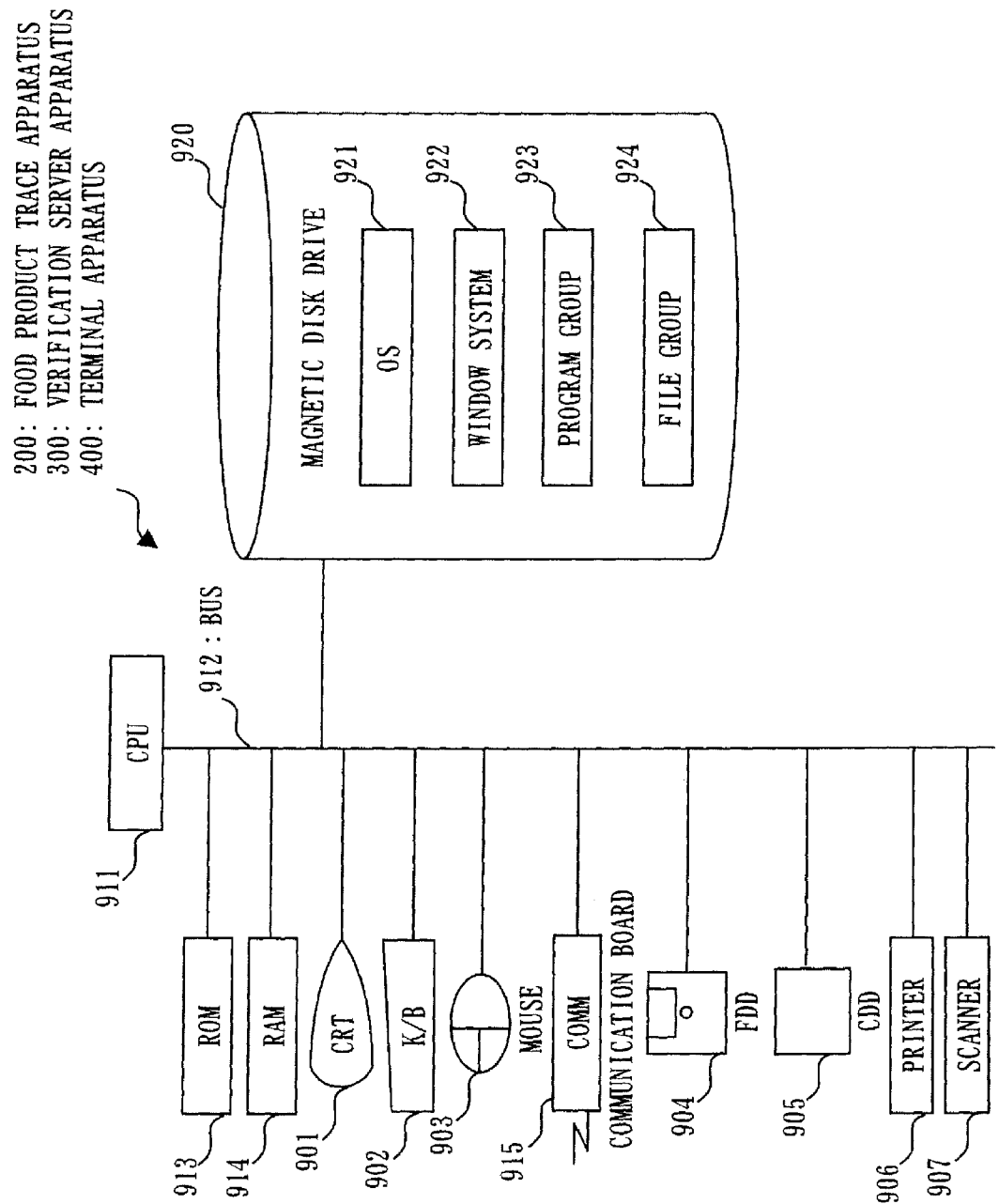
FIG. 12 shows an example of a hardware configuration of each apparatus configuring the food product trace system in each Embodiment.

DESCRIPTION OF THE REFERENCE NUMERALS 100 food product trace system, 150 network, 151 GPS satellite, 152 weather satellite, 200 food product trace apparatus, 201 CPU, 202 storage part, 203 input part, 204 read part, 205 output part, 206 comparison part, 207 link setting part, 300 verification server apparatus, 400 terminal apparatus, 401 purchaser, 402 producer, 403 distributor, 404 retailer, 901 CRT display, 902 K/B, 903 mouse, 904 FDD, 905 CDD, 906 printer, 907 scanner, 910 system unit, 911 CPU, 912 bus, 913 ROM, 914 RAM, 915 communication board, 920 magnetic disk drive, 921 OS, 922 window system, 923 program group, 924 file group, 931 telephone, 932 facsimile machine, 940 Internet, 941 gateway, 942 LAN.

The invention claimed is:

1. A food product trace apparatus comprising:
a storage part to store a first ingredient analysis result of analyzing an ingredient of a food product;
an input part to input verification information verifying a shipment location of the food product, generated by a verification server apparatus which generates the verification information, and a second ingredient analysis result of analyzing the ingredient of the food product after shipment of the food product;
a read part to read the first ingredient analysis result of the food product shipped at the shipment location verified by the verification information inputted by the input part, from the storage part;
a comparison part to compare, by using a processing device, the first ingredient analysis result read by the read part with the second ingredient analysis result inputted by the input part; and
an output part to output a comparison result of the comparison part and shipment location information indicating the shipment location verified by the verification information inputted by the input part.

2. The food product trace apparatus of claim 1, wherein
the first ingredient analysis result is a result of analyzing the ingredient of the food product at shipment of the food product,
the storage part stores the first ingredient analysis result upon making the first ingredient analysis result corresponding to the verification information generated by the verification server apparatus, and
the read part reads the first ingredient analysis result corresponding to the verification information inputted by the input part, from the storage part.

3. The food product trace apparatus of claim 1, wherein
the first ingredient analysis result is a result of analyzing the ingredient of the food product for each shipment location of the food product, and
the read part reads the first ingredient analysis result corresponding to the shipment location verified by the verification information inputted by the input part, from the storage part.

4. The food product trace apparatus of claim 1, wherein
the verification information is information verifying a shipment location and a shipment time of the food product, and the output part outputs the comparison result of the comparison part and information indicating the shipment location and the shipment time verified by the verification information inputted by the input part.

5. The food product trace apparatus of claim 4, wherein
the first ingredient analysis result is a result of analyzing the ingredient of the food product for each shipment location and freshness degree of the food product, and
the read part judges a freshness degree of the food product based on the shipment time verified by the verification information inputted by the input part, and reads the first ingredient analysis result corresponding to the shipment location verified by the verification information inputted by the input part and the freshness degree judged, from the storage part.

6. The food product trace apparatus of claim 4, wherein
the shipment location includes a production location of the food product and a transit location in a distribution process of the food product,
the shipment time includes a shipment time at the production location and a transit time at the transit location,
the storage part stores the first ingredient analysis result of analyzing the ingredient of the food product at shipment of the food product upon making the first ingredient analysis result corresponding to the verification information verifying the production location and the shipment time of the food product, generated by the verification server apparatus, and stores the first ingredient analysis result of analyzing the ingredient of the food product at transit upon making the first ingredient analysis result corresponding to the verification information verifying the transit location and the transit time in the distribution process of the food product, generated by the verification server apparatus, and
the read part reads the first ingredient analysis result corresponding to the verification information inputted by the input part, from the storage part.

7. The food product trace apparatus of claim 6 further comprising:
a link setting part to set a link between verification information adjoining in accordance with an order of the shipment time verified by the verification information stored in the storage part, wherein
the read part reads the first ingredient analysis result corresponding to the verification information inputted by the input part, and a first ingredient analysis result corresponding to verification information to which a link with the verification information inputted by the input part is set by the link setting part, from the storage part,
the comparison part compares, by using the processing device, two first ingredient analysis results read by the read part, and
the output part outputs the comparison result of the comparison part, the shipment location information indicating the shipment location verified by the verification information inputted by the input part, and shipment location information indicating a shipment location verified by the verification information to which the link with the verification information inputted by the input part is set by the link setting part.

8. The food product trace apparatus of claim 1, wherein
either one of the food product and packing of the food product has an attached label displaying a bar code by which the verification information is encoded, and
the input part inputs the verification information upon reading the verification information from the bar code by using a bar code reader.

9. A food product trace system comprising:
  a verification server apparatus to generate verification information verifying a shipment location of a food product; and
  a food product trace apparatus including
  a storage part to store a first ingredient analysis result of analyzing an ingredient of the food product,
  an input part to input the verification information generated by the verification server apparatus, and a second ingredient analysis result of analyzing the ingredient of the food product after shipment of the food product,
  a read part to read the first ingredient analysis result of the food product shipped at the shipment location verified by the verification information inputted by the input part, from the storage part,
  a comparison part to compare, by using a processing device, the first ingredient analysis result read by the read part with the second ingredient analysis result inputted by the input part, and
  an output part to output a comparison result of the comparison part and shipment location information indicating the shipment location verified by the verification information inputted by the input part.

10. The food product trace system of claim 9, wherein
  the first ingredient analysis result is a result of analyzing the ingredient of the food product at shipment of the food product,
  the storage part included in the food product trace apparatus stores the first ingredient analysis result upon making the first ingredient analysis result corresponding to the verification information generated by the verification server apparatus, and
  the read part included in the food product trace apparatus reads the first ingredient analysis result corresponding to the verification information inputted by the input part, from the storage part.

11. The food product trace system of claim 9, wherein
  the first ingredient analysis result is a result of analyzing the ingredient of the food product for each shipment location of the food product, and
  the read part included in the food product trace apparatus reads the first ingredient analysis result corresponding to the shipment location verified by the verification information inputted by the input part, from the storage part.

12. The food product trace system of claim 9, wherein
  the verification information is information verifying a shipment location and a shipment time of the food product, and
  the output part included in the food product trace apparatus outputs the comparison result of the comparison part and information indicating the shipment location and the shipment time verified by the verification information inputted by the input part.

13. The food product trace system of claim 12, wherein
  the first ingredient analysis result is a result of analyzing the ingredient of the food product for each shipment location and freshness degree of the food product, and
  the read part included in the food product trace apparatus judges a freshness degree of the food product based on the shipment time verified by the verification information inputted by the input part, and reads the first ingredient analysis result corresponding to the shipment location verified by the verification information inputted by the input part and the freshness degree judged, from the storage part.

14. The food product trace system of claim 12, wherein
  the shipment location includes a production location of the food product and a transit location in a distribution process of the food product,
  the shipment time includes a shipment time at the production location, and a transit time at the transit location,
  the storage part included in the food product trace apparatus stores the first ingredient analysis result of analyzing the ingredient of the food product at shipment of the food product upon making the first ingredient analysis result corresponding to the verification information verifying the production location and the shipment time of the food product, generated by the verification server apparatus, and stores the first ingredient analysis result of analyzing the ingredient of the food product at transit upon making the first ingredient analysis result corresponding to the verification information verifying the transit location and the transit time in the distribution process of the food product, generated by the verification server apparatus, and
  the read part included in the food product trace apparatus reads the first ingredient analysis result corresponding to the verification information inputted by the input part, from the storage part.

15. The food product trace system of claim 14, wherein
  the food product trace apparatus further includes a link setting part to set a link between verification information adjoining in accordance with an order of the shipment time verified by the verification information stored in the storage part,
  the read part included in the food product trace apparatus reads the first ingredient analysis result corresponding to the verification information inputted by the input part, and a first ingredient analysis result corresponding to verification information to which a link with the verification information inputted by the input part is set by the link setting part, from the storage part,
  the comparison part included in the food product trace apparatus compares, by using the processing device, two first ingredient analysis results read by the read part, and
  the output part included in the food product trace apparatus outputs the comparison result of the comparison part, the shipment location information indicating the shipment location verified by the verification information inputted by the input part, and shipment location information indicating a shipment location verified by the verification information to which the link with the verification information inputted by the input part is set by the link setting part.

16. The food product trace system of claim 9, wherein
  either one of the food product and packing of the food product has an attached label displaying a bar code by which the verification information is encoded, and
  the input part included in the food product trace apparatus inputs the verification information upon reading the verification information from the bar code by using a bar code reader.

17. The food product trace system of claim 9, wherein
  the verification server apparatus generates the verification information by synthesizing information indicating a position and a time and unique data obtained only at either one of the position and the time.

18. A food product trace method comprising:
- generating verification information verifying a shipment location of a food product, by a verification server apparatus;
- storing a first ingredient analysis result of analyzing an ingredient of the food product, by a storage part included in a food product trace apparatus;
- inputting the verification information generated by the verification server apparatus, and a second ingredient analysis result of analyzing the ingredient of the food product after shipment of the food product, by an input part included in the food product trace apparatus;
- reading the first ingredient analysis result of the food product shipped at the shipment location verified by the verification information inputted by the input part, from the storage part, by a read part included in the food product trace apparatus;
- comparing, by using a processing device, the first ingredient analysis result read by the read part with the second ingredient analysis result inputted by the input part, by a comparison part included in the food product trace apparatus; and
- outputting a comparison result of the comparison part and shipment location information indicating the shipment location verified by the verification information inputted by the input part, by an output part included in the food product trace apparatus.

19. The food product trace method of claim 18, wherein
- the first ingredient analysis result is a result of analyzing the ingredient of the food product at shipment of the food product, and
- the food product trace method includes
- storing the first ingredient analysis result upon making the first ingredient analysis result corresponding to the verification information generated by the verification server apparatus, by the storage part included in the food product trace apparatus, and
- reading the first ingredient analysis result corresponding to the verification information inputted by the input part, from the storage part, by the read part included in the food product trace apparatus.

20. The food product trace method of claim 18, wherein
- the first ingredient analysis result is a result of analyzing the ingredient of the food product for each shipment location of the food product, and
- the food product trace method includes
- reading the first ingredient analysis result corresponding to the shipment location verified by the verification information inputted by the input part, from the storage part, by the read part included in the food product trace apparatus.

* * * * *